(12) United States Patent
Singer

(10) Patent No.: US 10,252,679 B2
(45) Date of Patent: Apr. 9, 2019

(54) SKELETON FOR TRUCK BED AND CONVERTIBLE TOP

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 15/916,976

(22) Filed: Mar. 9, 2018

(65) Prior Publication Data

US 2018/0194296 A1 Jul. 12, 2018

Related U.S. Application Data

(63) Continuation-in-part of application No. 15/336,702, filed on Oct. 27, 2016, now Pat. No. 9,956,857.

(51) Int. Cl.
| | |
|---|---|
| *B60R 9/045* | (2006.01) |
| *B60R 9/055* | (2006.01) |
| *B60J 7/19* | (2006.01) |
| *B60J 7/10* | (2006.01) |
| *B60J 7/04* | (2006.01) |

(52) U.S. Cl.
CPC ............ *B60R 9/045* (2013.01); *B60J 7/04* (2013.01); *B60J 7/10* (2013.01); *B60J 7/194* (2013.01); *B60R 9/055* (2013.01)

(58) Field of Classification Search
CPC B60R 9/055; B60R 9/045; B60J 7/194; B60J 7/10; B60J 7/04
USPC .................................................. 296/100.09
See application file for complete search history.

(56) References Cited

U.S. PATENT DOCUMENTS

| | | | |
|---|---|---|---|
| 3,837,700 A | 9/1974 | Van Slyke | |
| 4,496,184 A | 1/1985 | Byrd et al. | |
| 4,932,717 A | 6/1990 | Swann | |
| 5,494,327 A | 2/1996 | Derecktor | |
| 6,439,646 B1 * | 8/2002 | Cornelius | B60J 7/102 224/309 |
| 7,914,064 B2 | 3/2011 | Joab | |
| 8,256,824 B2 | 9/2012 | Williamson et al. | |
| 8,348,328 B2 | 1/2013 | Walser et al. | |
| 8,511,736 B2 | 8/2013 | Williamson et al. | |
| 9,956,857 B1 | 5/2018 | Singer | |
| 2008/0116711 A1 | 5/2008 | Thacker | |
| 2012/0080901 A1 * | 4/2012 | Izydorek | B60R 9/042 296/37.6 |

OTHER PUBLICATIONS

Diamondbackcovers, Damondback 270 Installation Guide (manual), Feb. 2018.
Diamondbackcovers, Damondback HD SE Installation Guide (manual), Jan. 2018.
Undercover, Tonneau Installation Guide (manual), Apr. 2005.
Rugged Cover, Hard Tri-Fold Tonneau Installation Instructions (brochure), Jul. 24, 2013.

(Continued)

*Primary Examiner* — Joseph D. Pape
*Assistant Examiner* — Dana D Ivey
(74) *Attorney, Agent, or Firm* — Klein O'Neill & Singh LLP

(57) ABSTRACT

A truck bed accessory frame is disclosed therein which allows for reconfiguration between an opened position and a closed position. In the open position, objects taller than the frame can loaded onto the truck bed. In the closed position, objects placed in the truck bed can be protected from the environmental elements (e.g. rain and UV rays from the sun).

20 Claims, 28 Drawing Sheets

(56) References Cited

OTHER PUBLICATIONS

Jackrabbit, Standard Installation Instructions (manual), Jun. 2011.
Agri-Cover, Inc., Access Original Slantback Roll-Up Cover Installation Instructions (manual), Feb. 2018.
American Tonneau Company, Tri-Fold Tonneau Installation Guide (manual), at least as early as Oct. 2012.
Undercover, Inc., Ridgelander Installation Guide (manual), Oct. 2016.
Non-Final Office Action on co-pending US application (U.S. Appl. No. 16/040,416) dated Oct. 1, 2018.

* cited by examiner

SKELETON FOR TRUCK BED AND CONVERTIBLE TOP

CROSS-REFERENCE TO RELATED APPLICATIONS

This application is a continuation-in-part application of prior application Ser. No. 15/336,702, filed Oct. 27, 2016, the entire contents of which are incorporated herein by reference.

STATEMENT RE: FEDERALLY SPONSORED RESEARCH/DEVELOPMENT

Not Applicable

BACKGROUND

The various embodiments and aspects described herein relate to a truck bed accessory.

Sales of trucks have grown in the United States and abroad. These trucks are not only for industrial use but also for personal use. Individuals like trucks because they are versatile in that they can carry a load in the truck bed and also be configured to provide a protective covering over the truck bed. However, there are certain deficiencies in truck bed accessories.

Accordingly, there is a need in the art for improvement in use of truck bed accessories.

BRIEF SUMMARY

An accessory frame for a truck bed of the truck is disclosed herein. The accessory frame can be configured to provide for enclosure and also reconfigured so that the driver can utilize the full length, width, and height of the truck bed. For example, the accessory frame when configured to be open, a motorcycle can be loaded onto the truck bed even if the motorcycle is taller than the accessory frame. If the driver wants to form an enclosure over the truck bed, a foldable top can be deployed over the frame and also side panels can be attached to the frame to form the enclosure. Other accessories are also removably attachable to the frame including but not limited to a rack, flood lights and other accessories.

More particularly, a truck bed frame with a top traversable between a first opened configuration and a second closed configuration is disclosed. The truck bed frame may comprise the following components. A forward driver side post and a forward passenger side post disposed at forward corners of the truck bed, the forward driver and passenger side posts extending vertically upward with distal ends terminating at least about a height of the cab. A first set of rearward driver side post and a rearward passenger side post disposed at rearward corners of the truck bed. The first set of the rearward driver and passenger side posts may extend vertically upwards. A first set of driver and passenger side longitudinal extension members may extend between the forward and rearward driver and passenger side posts. A first top part of the top may be extendable between and may be removably attachable to the first set of driver and passenger side longitudinal extension members so that the first top part is traversed to the first opened configuration when the first top part is removed from the first set of driver and passenger side longitudinal extension members, and the top is traversed to the second closed configuration when the first top part is attached to the first set of driver and passenger side longitudinal extension members.

The first top part may further comprise a first rear cross member that extends between and is removably attachable to the upper portions of the rearward driver and passenger side posts of the first set. The first rear cross member may be removed from the upper portions of the first set of rearward driver and passenger side posts when the first top part is traversed to the first opened configuration. The first rear cross member may be attached to the upper portions of the first set of rearward driver and passenger side posts when the first top part is traversed to the second closed configuration.

The first top part may further comprise a first rear covering attachable to the first rear cross member and the first set of rearward driver and passenger side posts for providing a rain water tight seal with the first set of rearward driver and passenger side posts and the first rear cross member.

The frame may further comprise a front cross member that extends between and is attached to the upper portions of the forward driver and passenger side posts.

The frame may further comprise a front covering attachable to the front cross member and the forward driver and passenger side posts for providing a rain water tight seal with the forward driver and passenger side posts and the front cross member.

The frame may further comprise first driver and passenger side coverings attachable to the first set of driver and passenger side longitudinal extension members and the forward driver and passenger side posts and the first set of the rearward driver and passenger side posts for providing a rain water tight seal with the first set of driver and passenger side longitudinal extension members and the forward driver and passenger side posts and the first set of rearward driver and passenger side posts.

The first top part may be collapsible.

The frame may further comprise a second set of rearward driver side post and a rearward passenger side post which are shorter than the first set of the rearward driver side post and rearward passenger side post; and a second set of driver and passenger side longitudinal extension members that extend between and is attachable to the forward driver and passenger side posts and the second set of rearward driver and passenger side posts.

The frame may further comprise a second top part extendable between and is removably attachable to the second set of driver and passenger side longitudinal extension members so that the second top part is traversed to the first opened configuration when the second top part is removed from the second set of driver and passenger side longitudinal extension members, and the second top part is traversed to the second closed configuration when the second top part is attached to the second set of driver and passenger side longitudinal extension members.

The second top part may further comprises a second rear cross member that extends between and is removably attachable to the upper portions of the rearward driver and passenger side posts of the second set. The second rear cross member may be removed from the upper portions of the second set of rearward driver and passenger side posts when the second top part is traversed to the first opened configuration, and the second rear cross member may be attached to the upper portions of the second set of rearward driver and passenger side posts when the second top part is traversed to the second closed configuration.

The frame may further comprise second driver and passenger side coverings attachable to the second set of driver and passenger side longitudinal extension members and the forward driver and passenger side posts and the second set of the rearward driver and passenger side posts for providing a rain water tight seal with the second set of driver and passenger side longitudinal extension members and the forward driver and passenger side posts and the second set of rearward driver and passenger side posts.

The second top part may further comprise a second rear covering attachable to the second rear cross member and the second set of rearward driver and passenger side posts for providing a rain water tight seal with the second set of rearward driver and passenger side posts and the second rear cross member.

According to another embodiment, there is provided a truck bed cover for a truck bed. The truck bed cover may include a pair of side posts disposable adjacent respective forward corners of the truck bed so as to extend vertically upward from the truck bed and terminate at a respective top end at least about a height of the cab. A first pair of longitudinal extension members may extend from respective ones of the pair of side posts. A second pair of longitudinal extension members may extend from respective ones of the pair of side posts in spaced relation to the first pair of longitudinal extension members. A first pair of primary connectors may be connected to respective ones of the first pair of longitudinal extension members. A second pair of primary connectors may be connected to respective ones of the second pair of longitudinal extension members. The truck bed cover may additionally include a top having a top panel and a pair of secondary connectors coupled to the top panel. The top may be transitional between a first deployed position, and a second deployed position. In the first deployed position, the pair of secondary connectors may be coupled to respective ones of the first pair of primary connectors, and in the second deployed position, the pair of secondary connectors may be coupled to respective ones of the second pair of primary connectors.

The first pair of primary connectors may be identical to the second pair of primary connectors.

The first pair of longitudinal extension members may extend from respective ones of the pair of side posts adjacent the top ends thereof. Each of the pair of side posts may include a bottom end opposite the top end, and the second pair of longitudinal extension member extend from respective ones of the pair of side posts adjacent the bottom end thereof. The first pair of longitudinal extension members may be parallel to the second pair of longitudinal extension members.

Each of the pair of secondary connectors may include a portion pivotable relative to the top panel.

The pair of secondary connectors may be selectively engageable with the first pair of primary connectors and the second pair of primary connectors via snap-fit engagement.

According to another embodiment, there is provided a truck bed cover for a truck bed. The truck bed cover may comprise a pair of side posts disposable adjacent respective forward corners of the truck bed so as to extend vertically upward from the truck bed and terminate at a respective top end at least about a height of the cab. A pair of longitudinal extension members may extend from respective ones of the pair of side posts. A first pair of primary connectors may be connected to respective ones of the pair of longitudinal extension members, and a second pair of primary connectors may be positionable at respective portions of the truck bed. The truck bed cover may additionally include a top having a top panel and a pair of secondary connectors coupled to the top panel. The top may be transitional between a first deployed position, and a second deployed position. In the first deployed position, the pair of secondary connectors may be coupled to respective ones of the first pair of primary connectors, and in the second deployed position, the pair of secondary connectors may be coupled to respective ones of the second pair of primary connectors.

According to yet another embodiment, there is provided a cover for a truck bed comprising a pair of truck bed walls. The cover may comprise a pair of support frames engageable with the truck bed in opposed relation to each other. Each support frame may include an upper longitudinal member and a lower longitudinal member spaced from the upper longitudinal member. A pair of upper connectors may be coupled to respective ones of the pair of support frames at the upper longitudinal member thereof. A pair of lower connectors may be coupled to respective ones of the pair of support frames at the lower longitudinal member thereof. The cover may additionally include a top having a top panel and a pair of panel connectors coupled to the top panel. The top may be transitional between a first deployed position, and a second deployed position. In the first deployed position, the pair of panel connectors may be coupled to respective ones of the pair of upper connectors, and in the second deployed position, the pair of panel connectors may be coupled to respective ones of the pair of lower connectors.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
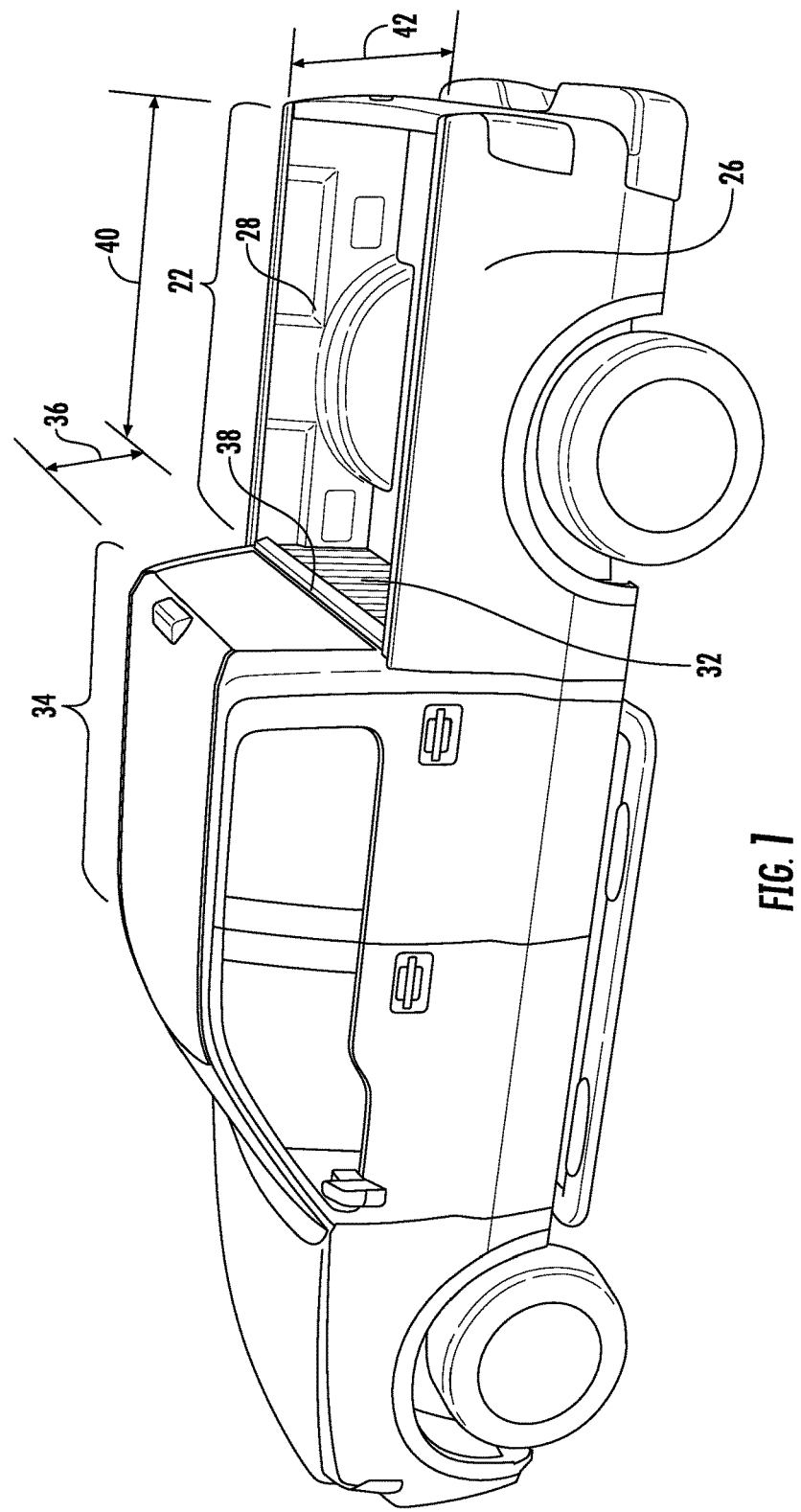
FIG. 1 is a perspective view of a truck.

Referring now to the drawings, a truck bed accessory frame 10, 210 (see FIGS. 4 and 23) is shown. The frame 10, 210 allows for various accessories to be removably mounted thereto such as a foldable top 12 (see FIGS. 4 and 14), removable side panels 14 (see FIG. 8), roof rack 16 (see FIG. 16), and pop-up top 18 are shown. The truck bed accessory frame 10, 210 may be configured to be enclosed, as shown in FIG. 15, partially open by removing one or more panels 14 or have an open top by removing the top 12 (see FIG. 13) so that a motorcycle 20 can fit in a truck bed 22. The truck bed accessory frame may form a box configured storage area, as shown in FIG. 9, or a slant back configuration, as shown in FIGS. 12, and 23-25. The truck bed accessory frame 10, 210 provides for flexible configuration that allows the user to have an enclosed truck bed area and one that is reconfigurable so that the full-length and height of the truck bed can be utilized and does not prevent the user from loading a motorcycle or something that is too high on the truck bed because of the truck bed accessory frame 10, 210.

Referring now to FIG. 1, a truck 24 shown. The truck 24 may have the truck bed 22. The truck bed has first and second sidewalls 26, 28, a tailgate 30, a front wall 32 and a cab 34 which is disposed in front of the front wall 32. The cab 34 also has a height 36 that extends vertically above a top edge 38 of the front wall 32. The truck bed 22 may have a length 40 of a short bed (e.g. 6 feet to 6.5 feet) or a long bed (e.g. 7 feet to 8 feet). The truck bed accessory frame 10, 210 may be sized and configured to be mounted to truck beds having various lengths 40 and widths 42.

Figure 2:
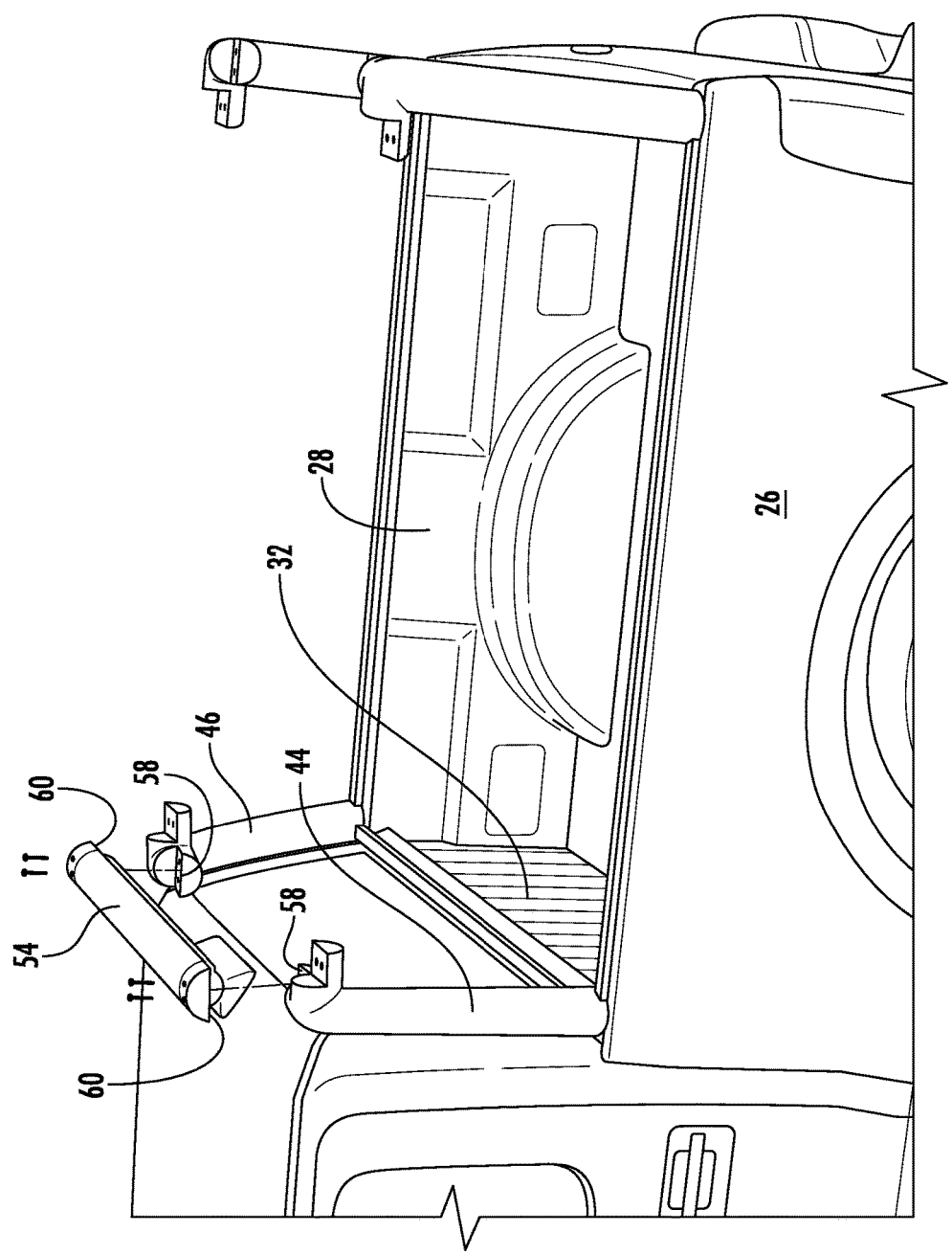
FIG. 2 is a perspective view of a truck bed with the frame being assembled on the truck bed.
Figure 23:
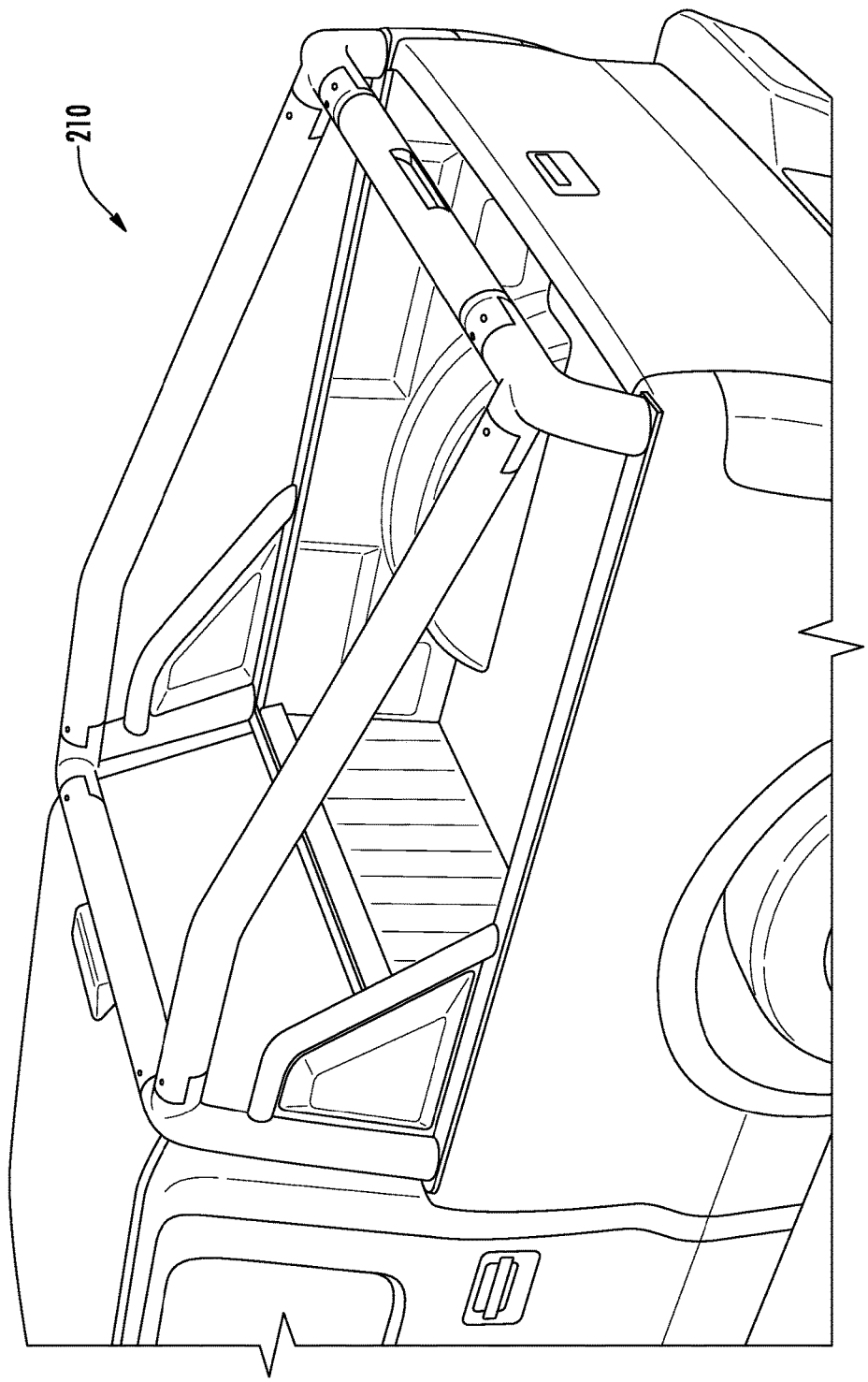
FIG. 23 illustrates a second embodiment of the frame.

Referring now to FIG. 2, the truck bed accessory frame 10 may have a forward driver side post 44, a forward passenger side post 46, a rearward driver side post 48, a rearward passenger side post 50 which are respectively aligned to corners of the truck bed 22, namely, the intersection between the first side wall 26 and the front wall 32, the intersection between the second sidewall 28 and the front wall 32 and the rear end portions of the first and second sidewalls 26, 28. The forward driver side and passenger side posts 44, 46 and the rearward driver side and passenger side posts 48, 50 may be mounted to a subframe 52. The subframe 52 may extend from the forward driver side post 44 to the rearward driver side post 48 and from the forward driver side post 44 to the forward passenger side post 46 and from the forward passenger side post 46 to the rearward passenger side post 50. The posts 44, 46, 48, 50 may be welded to the subframe 52. The subframe 52 may extend along the length of both sidewalls 26, 28 and along the front side above the top edge 38 of the front wall 32. The rearward driver side and passenger side posts 48, 50 may be similarly sized to the forward driver side and passenger side posts 44, 46, or alternatively, a rearward driver side and passenger side posts 248, 250 may be shorter as shown in FIG. 23, as will be discussed further below.

Figure 5:
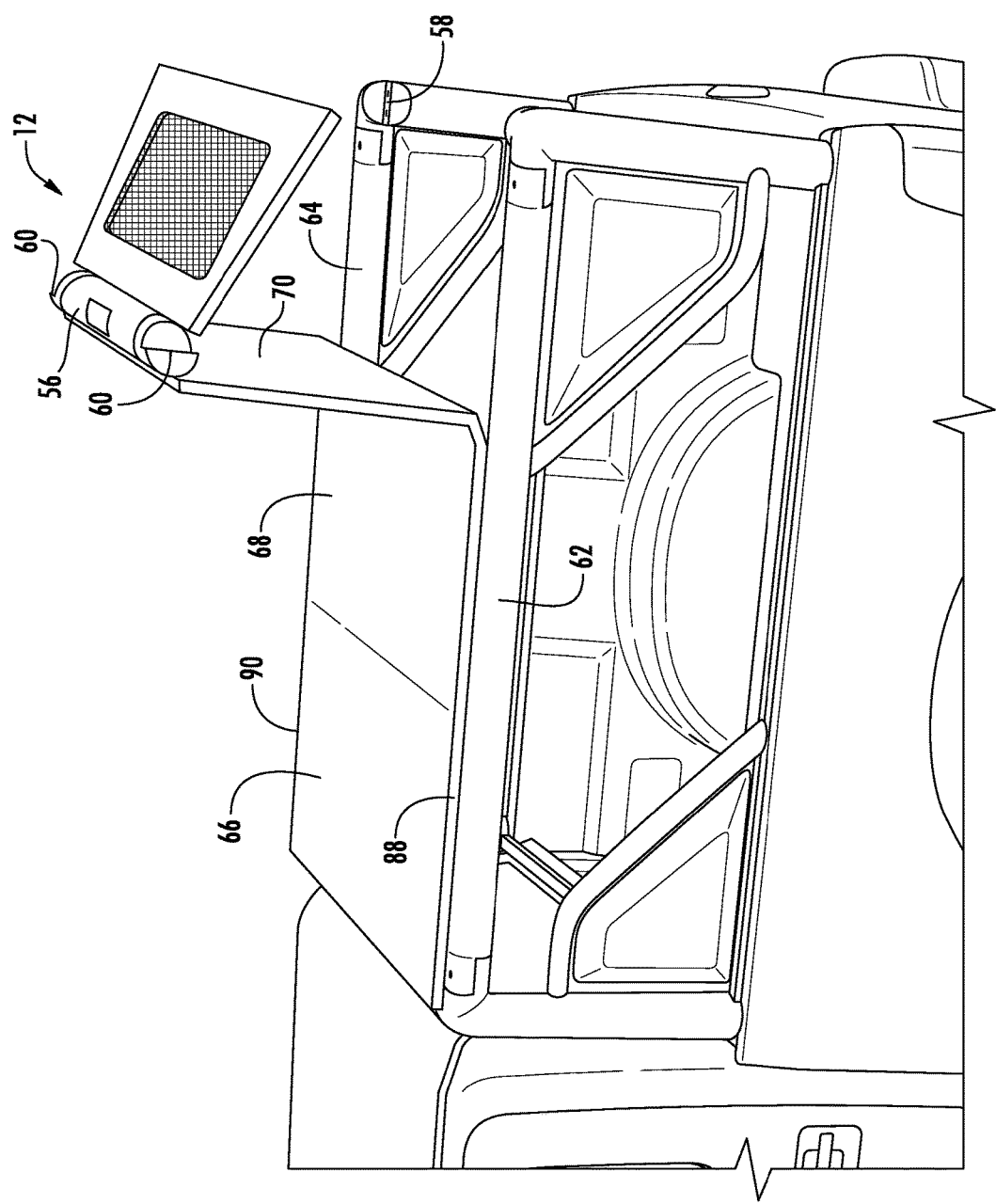
FIG. 5 is a perspective view of the truck bed and frame with the top being deployed on the frame.

The truck bed accessory frame 10, 210 may have a front crossmember 54 and a rear crossmember 56. The front crossmember 54 may be secured to the forward driver side and passenger side posts 44, 46 with fasteners. The front crossmember 54 and the upper end portions of the forward driver side and passenger side posts 44, 46 may have mating cutouts 58, 60, as shown in FIG. 2. The rear crossmember 56 may be secured to the rearward driver side and passenger side posts 48, 50 with fasteners as well. Similar to the front crossmember 54, the rear crossmember 56 and the upper end portions of the rearward driver side and passenger side posts 48, 50 may have mating cutouts 58, 60, as shown in FIG. 5. Although fasteners are not shown, they may be inserted into the apertures and received into respective threaded apertures. Additionally, the rear crossmember 56 may be easily removed and attached to the rearward driver side and passenger side posts 48, 50 by utilizing speed fasteners such as ball-lok pins fabricated by Avibank Manufacturing in Burbank, Calif.

Figure 3:
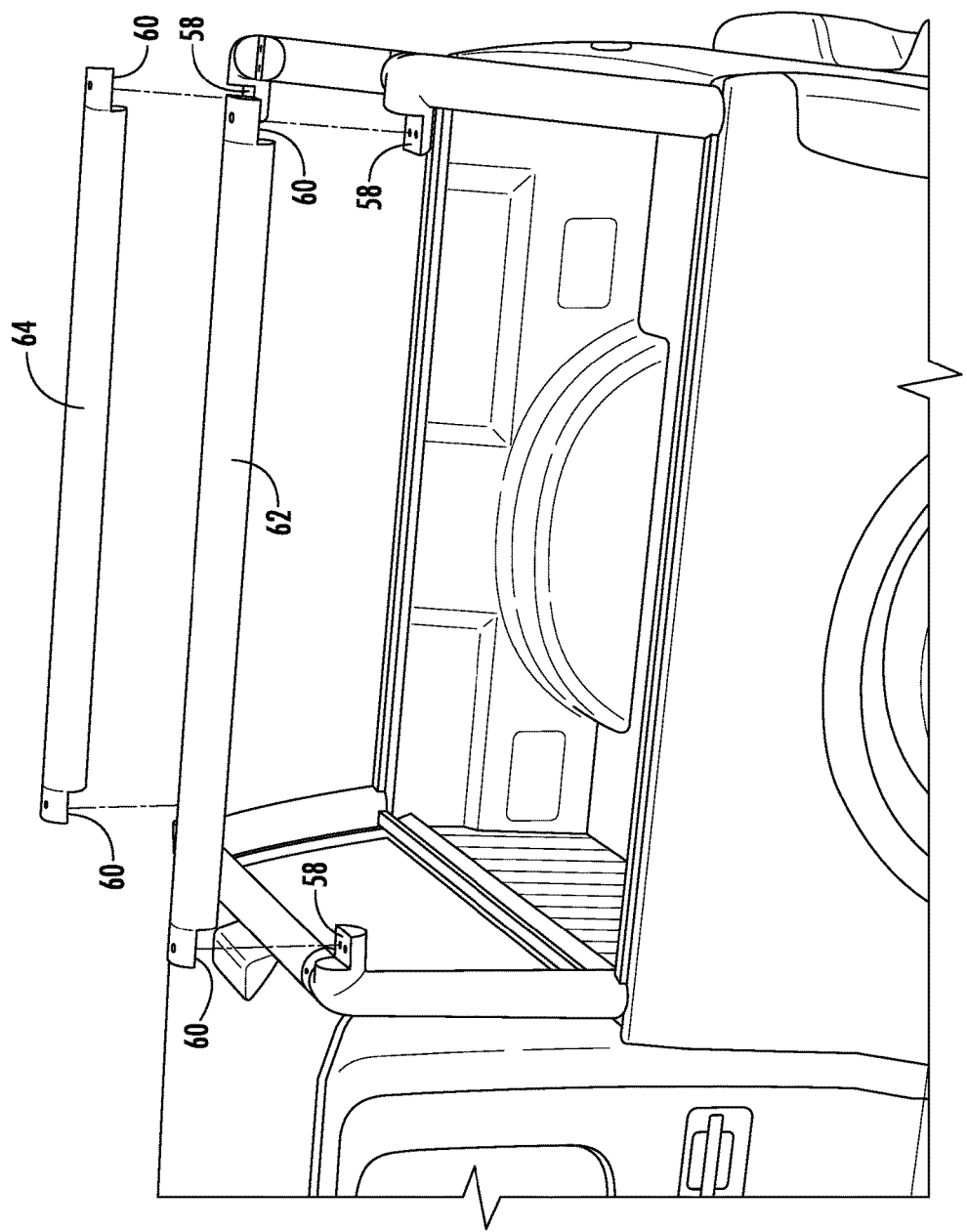
FIG. 3 is a perspective view of the truck bed with the frame being further assembled on the truck bed.

Referring now to FIG. 3, the truck bed accessory frame 10 may also have driver and passenger side longitudinal extension members 62, 64. The extension members 62, 64 may be secured to the forward and rearward driver side posts 44, 48 wherein the extension member 62, 64 on opposing end portions thereof and the upper end portions of the forward and rearward driver side posts 44, 48 may have mating cutouts 58, 60 that are secured to each other with fasteners, and the upper end portions of the forward and rearward passenger side posts 46, 50 may have mating cutouts 58, 60 that are secured to each other with fasteners.

Figure 4:
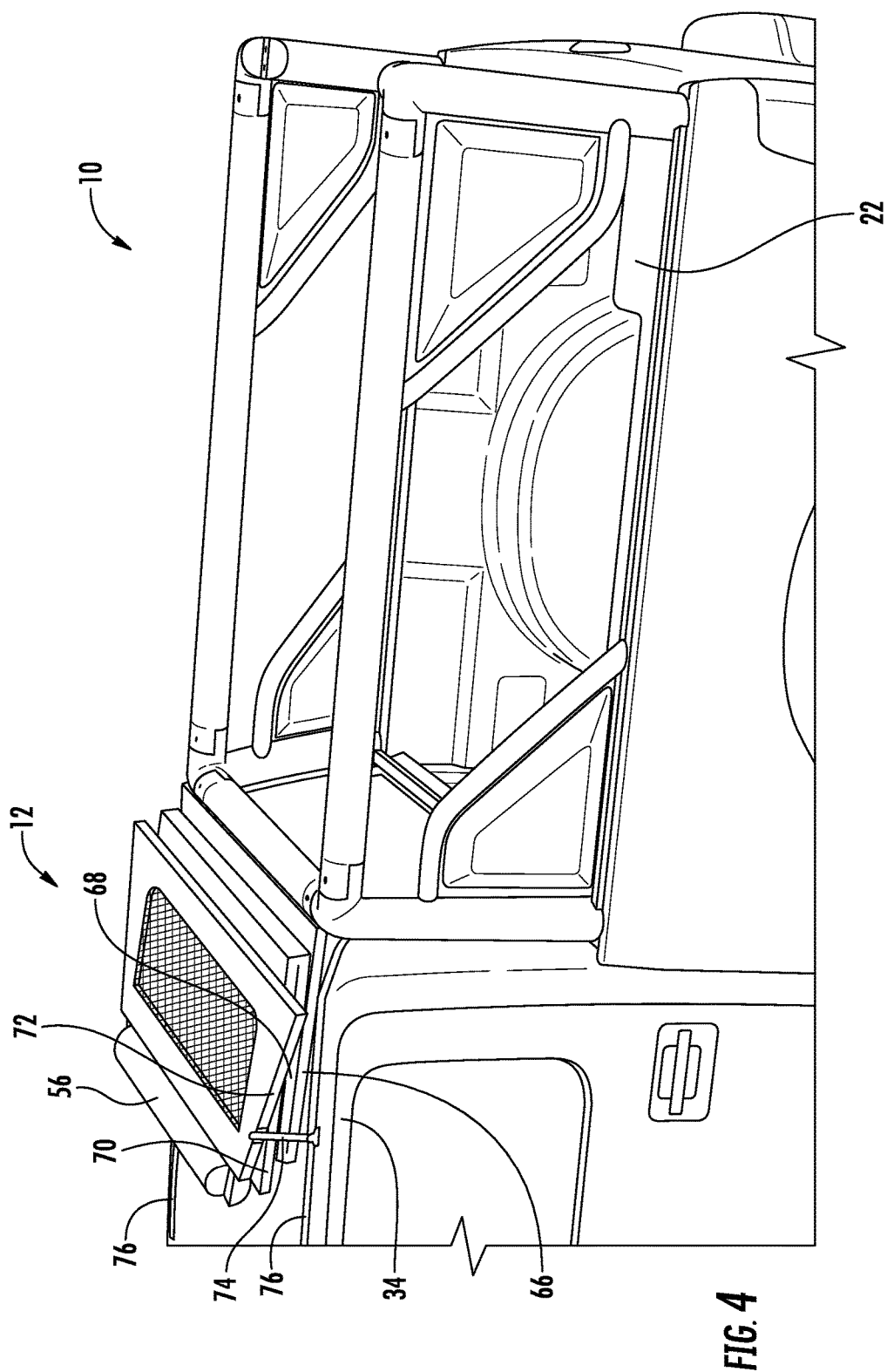
FIG. 4 is a perspective view of the truck bed and the frame with a top folded over a cab of the truck.
Figure 6:
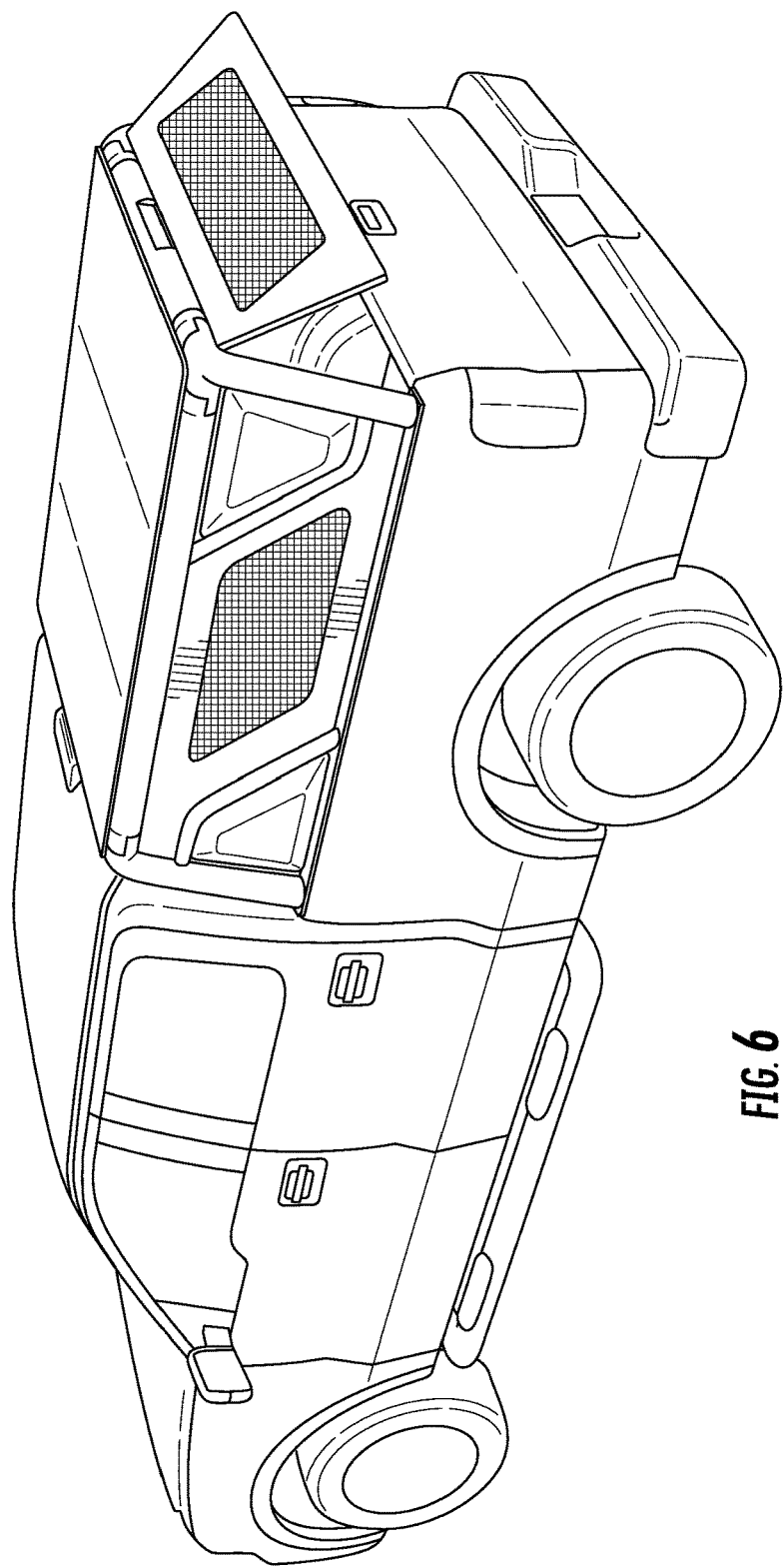
FIG. 6 is a perspective view of the truck bed and the frame with the top and side panels deployed on the frame.
Figure 7:
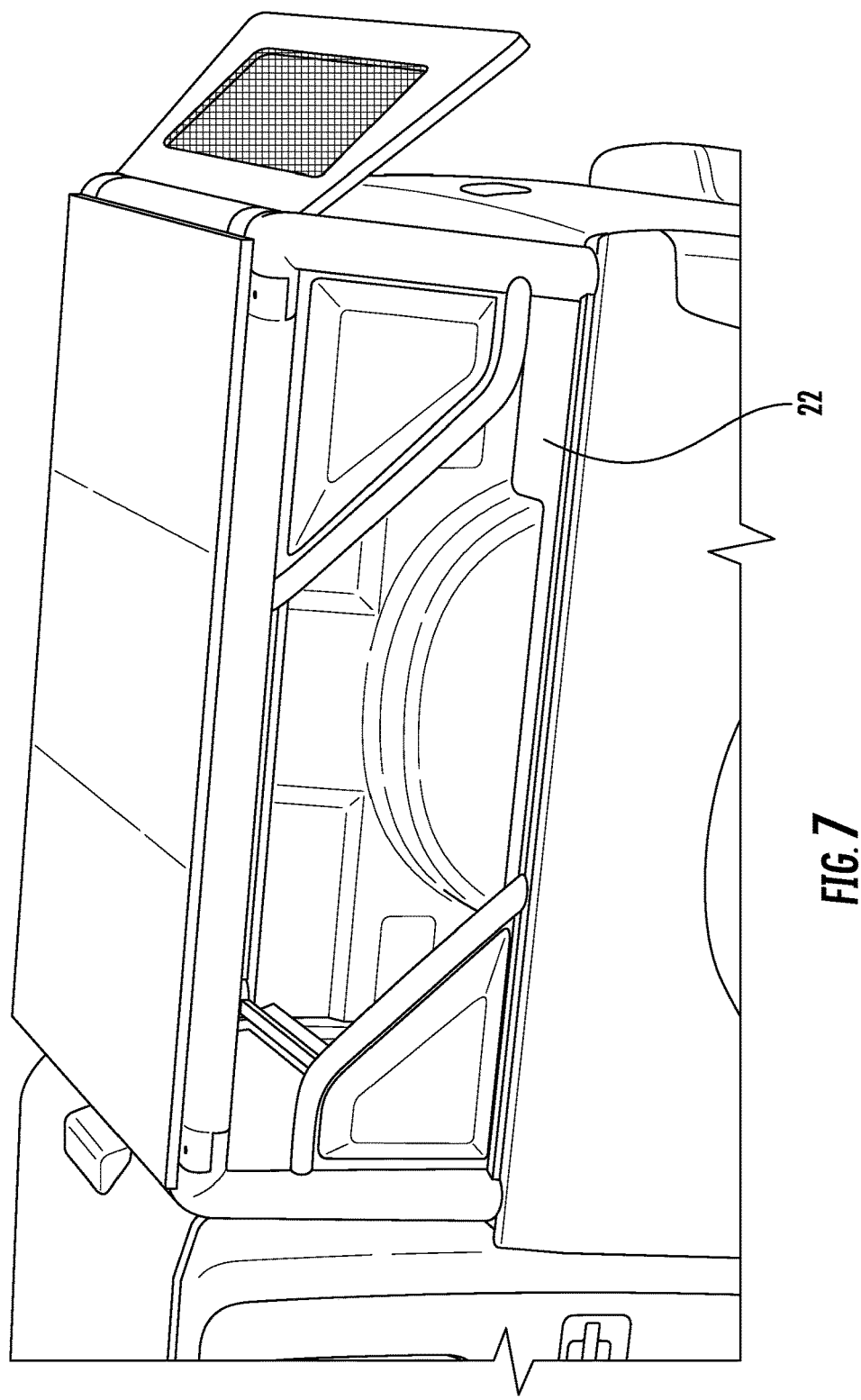
FIG. 7 is a perspective view of the truck bed and the frame with the side panels removed from the frame.

Referring now to FIGS. 4-7, the foldable top 12 is shown. The foldable top 12 may be stored above the cab 34 when the user wants full use of the truck bed 22. Alternatively, the user can deploy the top 12 as shown in FIGS. 6 and 7 so that the truck bed 22 is enclosed. The enclosure formed by the truck bed accessory frame 10 may be fully enclosed by securing side panels 14 to the respective posts 44, 46, 48, 50 and the front crossmember 54. The top 12 may have three panels 66, 68, 70 and a rear hatch 72. The panels 66, 68, 70 and the rear hatch 72 may be folded upon each other and stored above the cab 34, as shown in FIG. 4. The foldable top 12 may be secured to the roof of the cab 34 with rubber lockouts 74 (see FIG. 9). The rubber lockouts 74 may be attached to the rear hatch 72 and the roof of the cab 34 on both sides of the rear hatch 72. The rubber lockouts 74 may be secured to roof accessory rails 76 of the cab 34. The rubber lockouts 74 has a first part 78 secured to the rail 76 of the roof of the cab 34. The rubber lockouts 74 also has the second part 80 secured to the rear hatch 72. There is a rubber extension member 82 that is pivotally secured to the second part 80. The rubber extension member 82 may have a handle 84 that can be grasped to stretch the rubber extension member 82 so that an enlarged portion 86 can be pulled out of the first part 78 to dislodge the enlarged portion 86 of the rubber extension member 82 out of the first part 78. In this way, the panels 66, 68, 70 and the rear hatch 72 may be traversed from the stored position as shown in FIG. 4 to the deployed position as shown in FIG. 7. Left and right edges 88, 90 of the panels 66, 68, 70 may be secured to the driver and passenger side longitudinal extension members 62, 64 with removable fasteners including but not limited to screws, ball-lok pins and rubber lockouts 74 that are secured along the length of the edges 88, 90 and the driver and passenger longitudinal extension members 62, 64. Also, the rear crossmember 56 may be secured to the upper end portions of the rearward driver side and passenger side posts 48, 50 with fasteners or quick release fasteners.

Referring now to FIGS. 5-7, the rubber lockouts are not shown. However, this is merely for purposes of clarity. As is the case in relation to FIG. 19, the rubber lockouts 74 may be disposed about the top 12 in order to hold the top 12 down while driving the truck 24.

Figure 8:
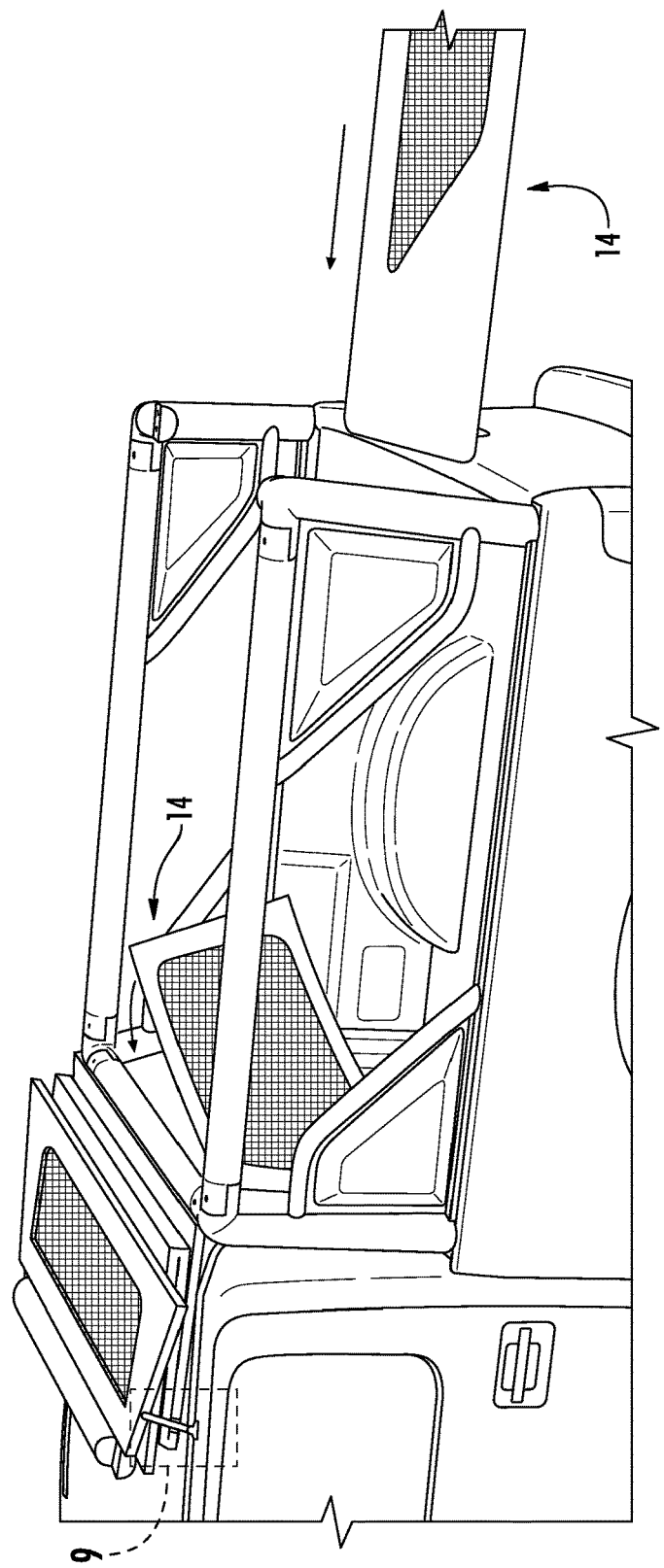
FIG. 8 illustrates side panels being mounted to the frame.
Figure 9:
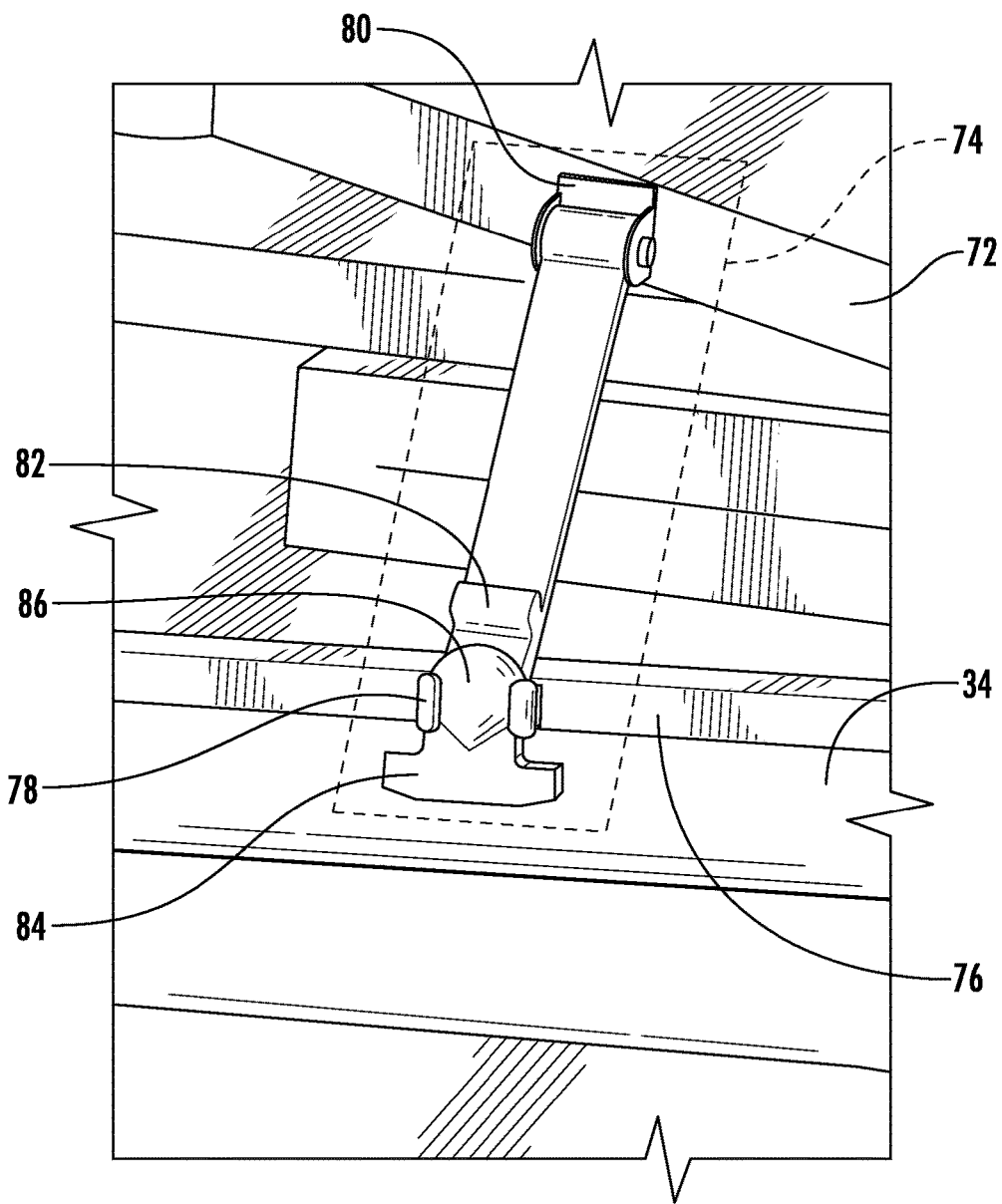
FIG. 9 illustrates rubber lockouts for securing the folded top to the cab, as shown in FIG. 4.
Figure 10:
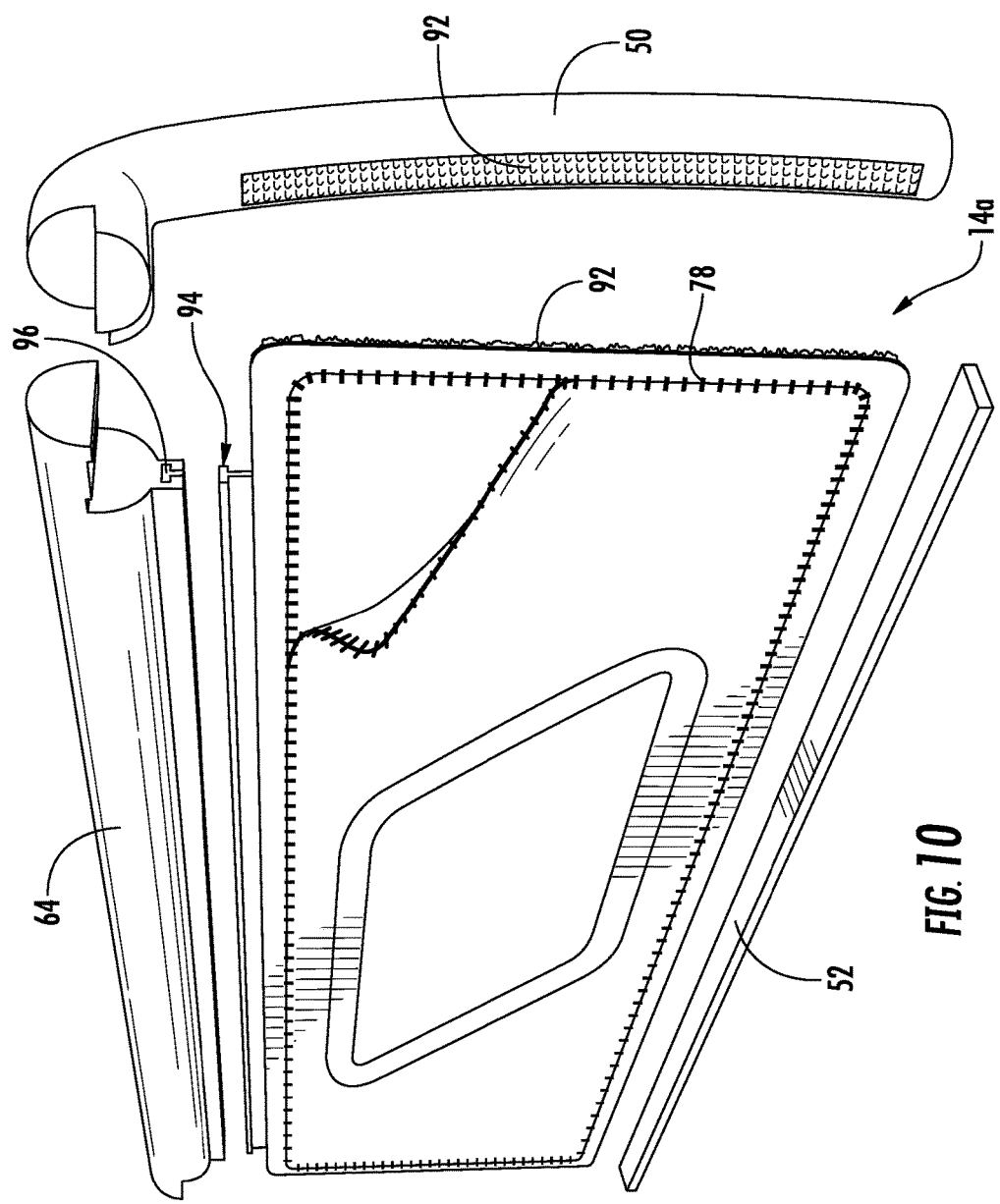
FIG. 10 illustrates the side panel and a first embodiment of securing the side panel to the frame.
Figure 11:
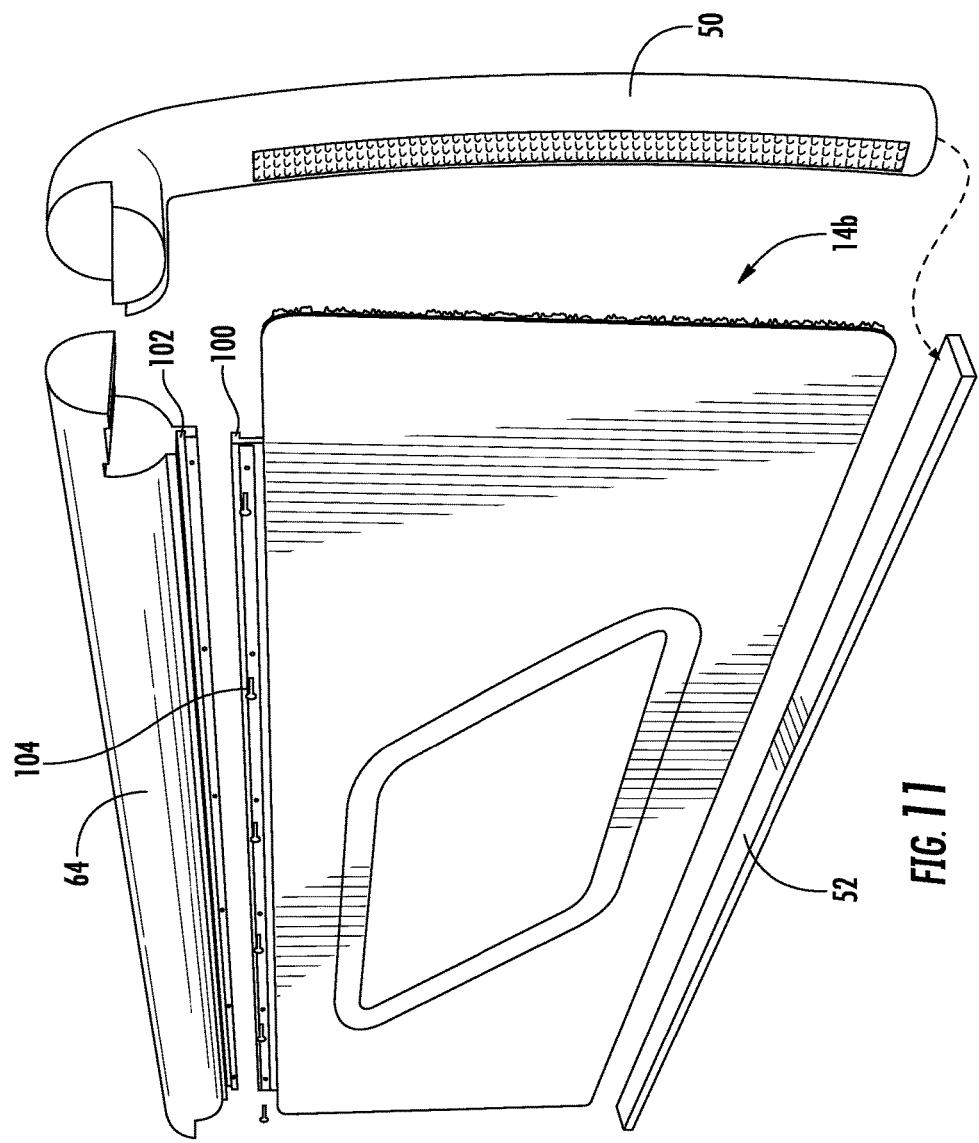
FIG. 11 illustrates a side panel and a second embodiment of securing the side panel to the frame.

Referring now to FIG. 8, panels 14 may be secured to the frame 10 in order to form an enclosure. The panels 14 may be attached to the sides and the front of the frame 10. The panels 14 may be removably secured to the posts 44, 46, 48, 50 and the front crossmember 54 as shown in FIGS. 10 and 11. In FIGS. 10 and 11, the side panel 14 is shown as being removably securable to the passenger longitudinal extension member 64 and the rearward passenger side post 50 and the subframe 52. The subframe 52 and the rearward passenger side post 50 are shown as being detached from each other but this is for clarity. The bottom end of the rearward passenger side post 50 may be permanently secured to the subframe 52. The rearward passenger side post 50 is shown as being detached from the passenger longitudinal extension member 64 for the purpose of showing the interconnection between the panel 14 and the subframe 52, the rearward passenger side post 50 and the passenger longitudinal extension member 64. FIGS. 10 and 11 illustrate two different means of attaching the panel to the frame 10. In FIG. 10, the panel 14a may be secured to the rearward passenger side post 50 with hooks and loops. The upper edge of the panel 14a may be secured to the passenger longitudinal extension member 64 with a T slot. The panel 14a may have a T shaped male prong 94 and the passenger longitudinal extension member 64 may have a mating T shaped cavity 96. The T shaped male prong 94 may be slid into the female cavity 96. Thereafter, the passenger longitudinal extension member 64 may be secured to the passenger side posts 46, 50 with fasteners. The hooks and loops 92 may be used to attach the panel 14a to the forward and rearward passenger side posts 46, 50. Hooks and loops may also be used to secure the panel 14a to the subframe 52. Once the panel 14a is secured, a zipper 98 may be used to open up or close the side of the frame 10. The same structure used to secure the panel 14a to the passenger side of the frame 10 may also be utilized to secure a panel 14a to the front and driver sides of the frame 10.

In FIG. 11, the panel 14b may be secured to the frame 10 in the same manner except that the panel 14b does not have a zippered window and the interconnection between the panel 14b and the passenger longitudinal extension member 64 may be with an L shaped slot. In particular, this embodiment allows the panel 14b to be secured to the frame while the passenger longitudinal extension member 64 is already mounted to the passenger side posts 46, 50. The L shaped prong 100 may be received into an L shaped cavity 102. Fasteners 106 may be used to screw and hold the L shaped prong 100 into the L shaped cavity 102. The interconnections between the T shaped prong and the L shaped prong 94, 100 form a watertight connection. The T shaped prong and the L shaped prong 94, 100 connects to form a watertight connection with the passenger longitudinal extension member 64, driver longitudinal extension member 62 and the front crossmember 54.

Figure 12:
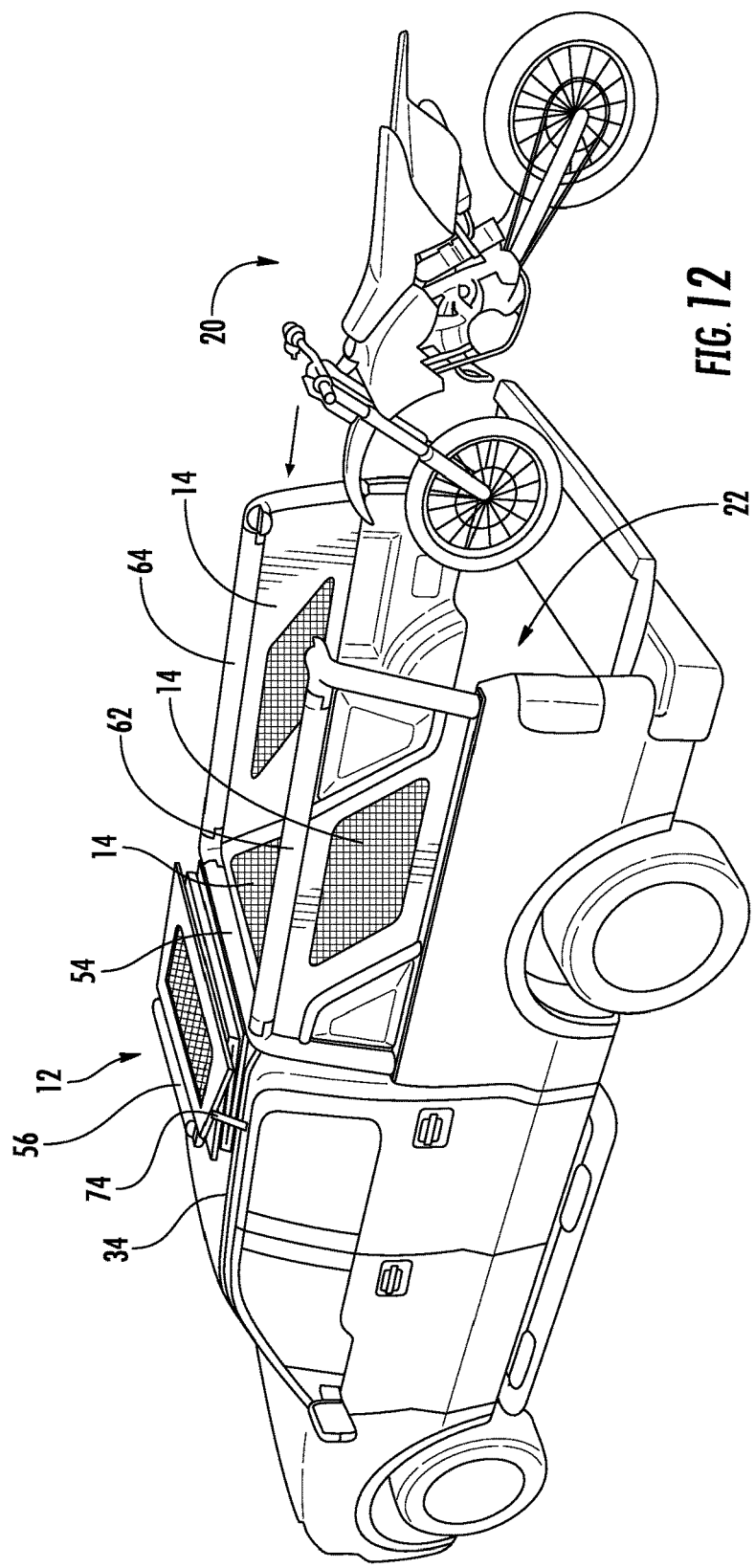
FIG. 12 illustrates a motorcycle being loaded on the truck bed and the top being in a stored position over the cab.
Figure 13:
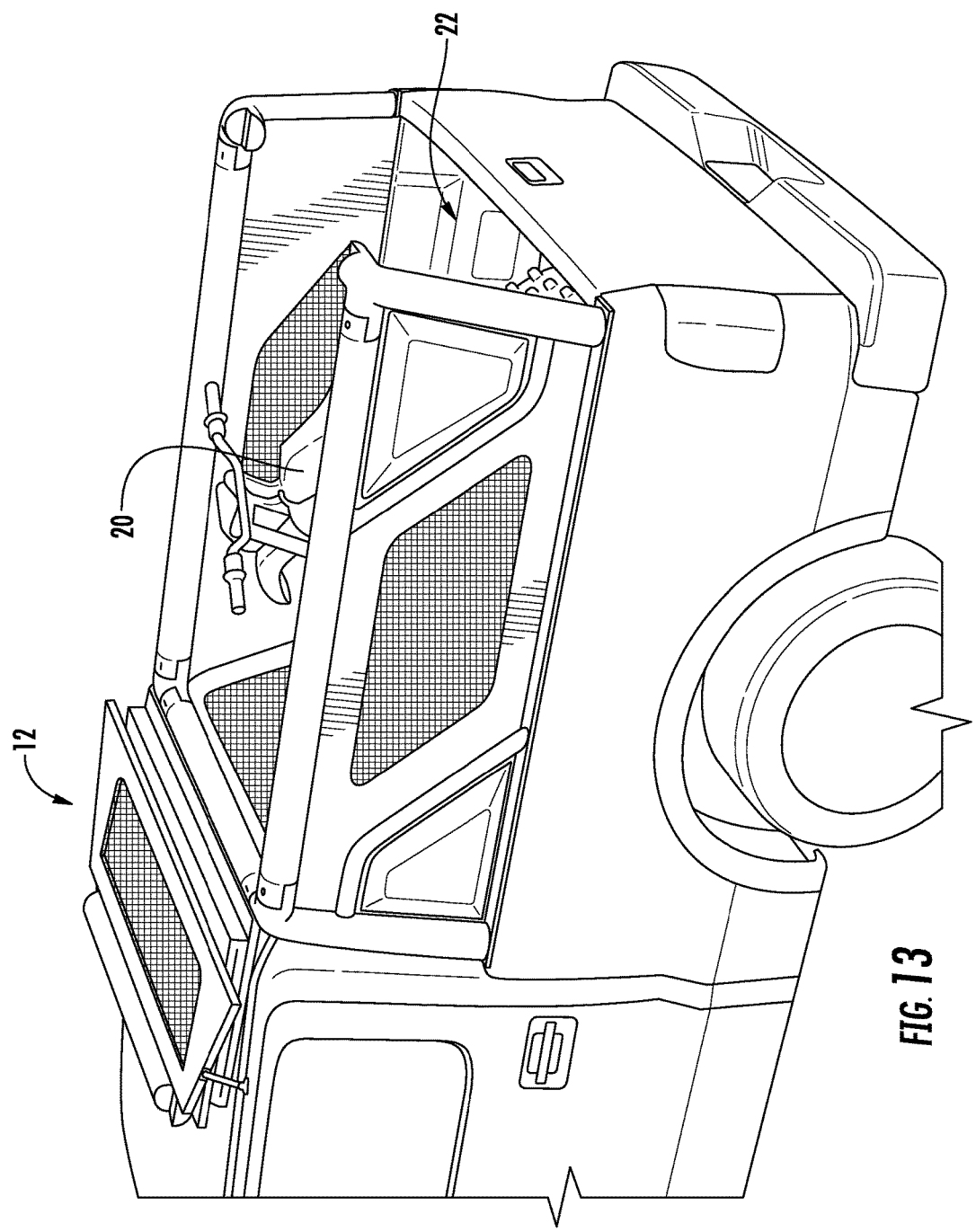
FIG. 13 illustrates a motorcycle loaded on the truck bed.

Referring now to FIGS. 12 and 13, the motorcycle 20 may be loaded onto the truck bed. This is true even if the height of the motorcycle extends above the front cross member 54 and the driver and longitudinal extension members 62, 64. When the motorcycle 20 is loaded onto the truck bed 22, the foldable top 12 is secured to the cab 34 with the rubber lockouts 74. Additionally, the panels 14 prevent dirt and debris from entering the truck bed 22. The motorcycle 20 may be locked down to the truck bed 22.

Figure 14:
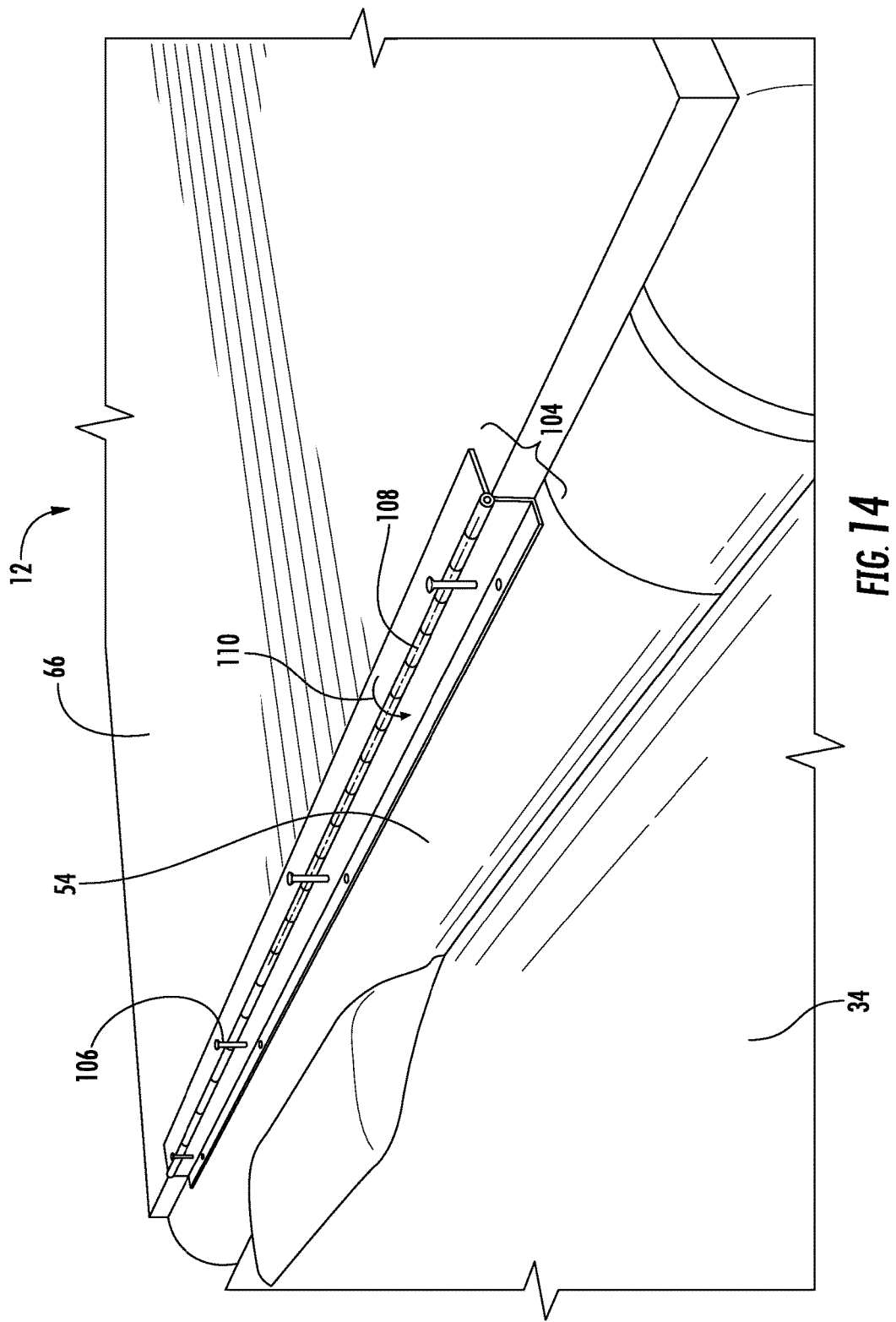
FIG. 14 illustrates a front edge of the top capable of being pivoted so that the folded top can be stored on top of the cab.
Figure 15:
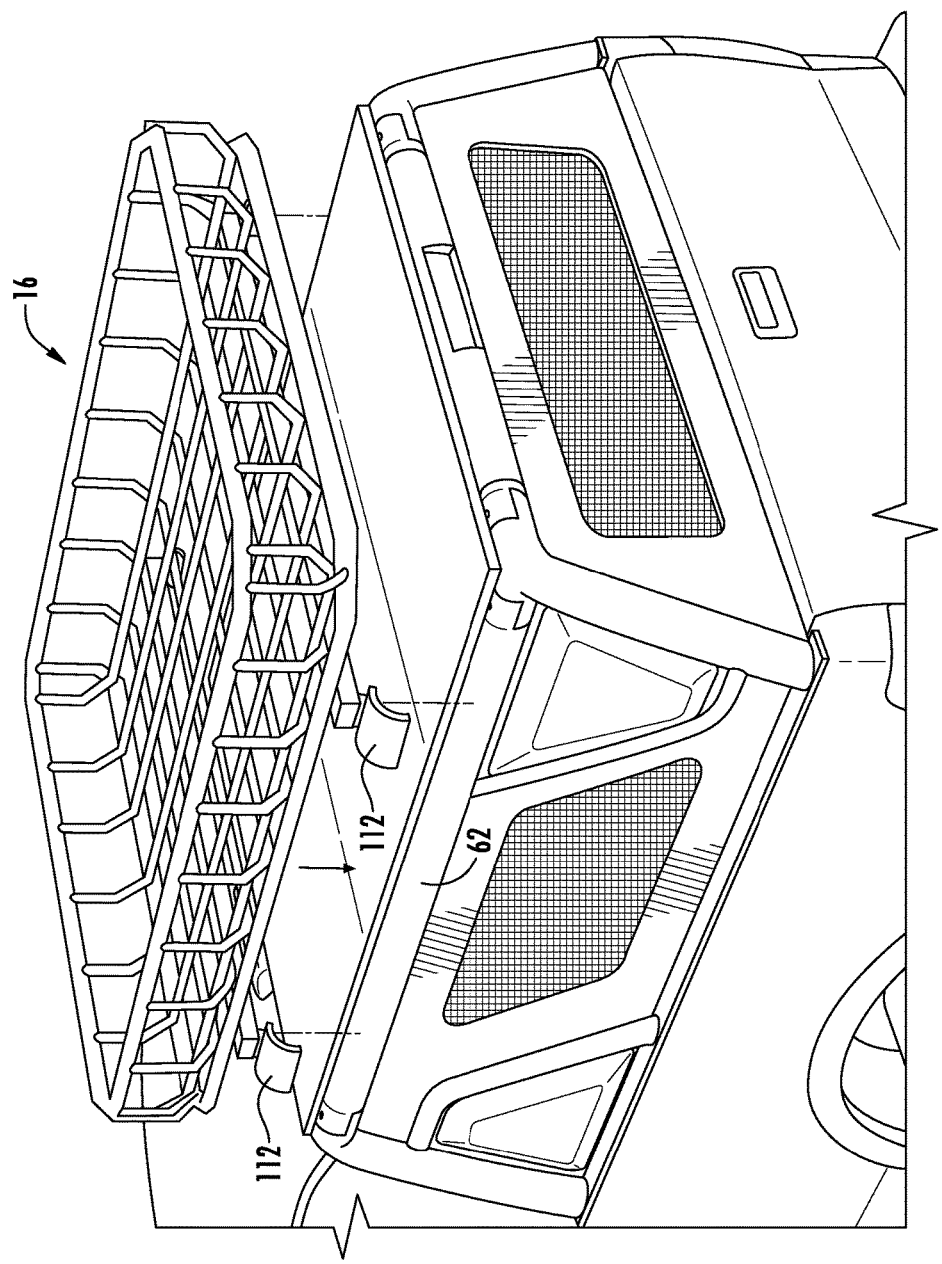
FIG. 15 illustrates a rack being mountable to the frame.

Referring now to FIG. 14, a hinge 104 is shown which allows the foldable top 12 to be stored over the cab 34. In particular, the hinge 104 may be secured to the front cross member 54 with fasteners 106 and the panel 66 of the foldable top 12. The panel 66 is rotatable 180° about a pivot axis 108 in the direction of rotational arrow 110.

Figure 16:
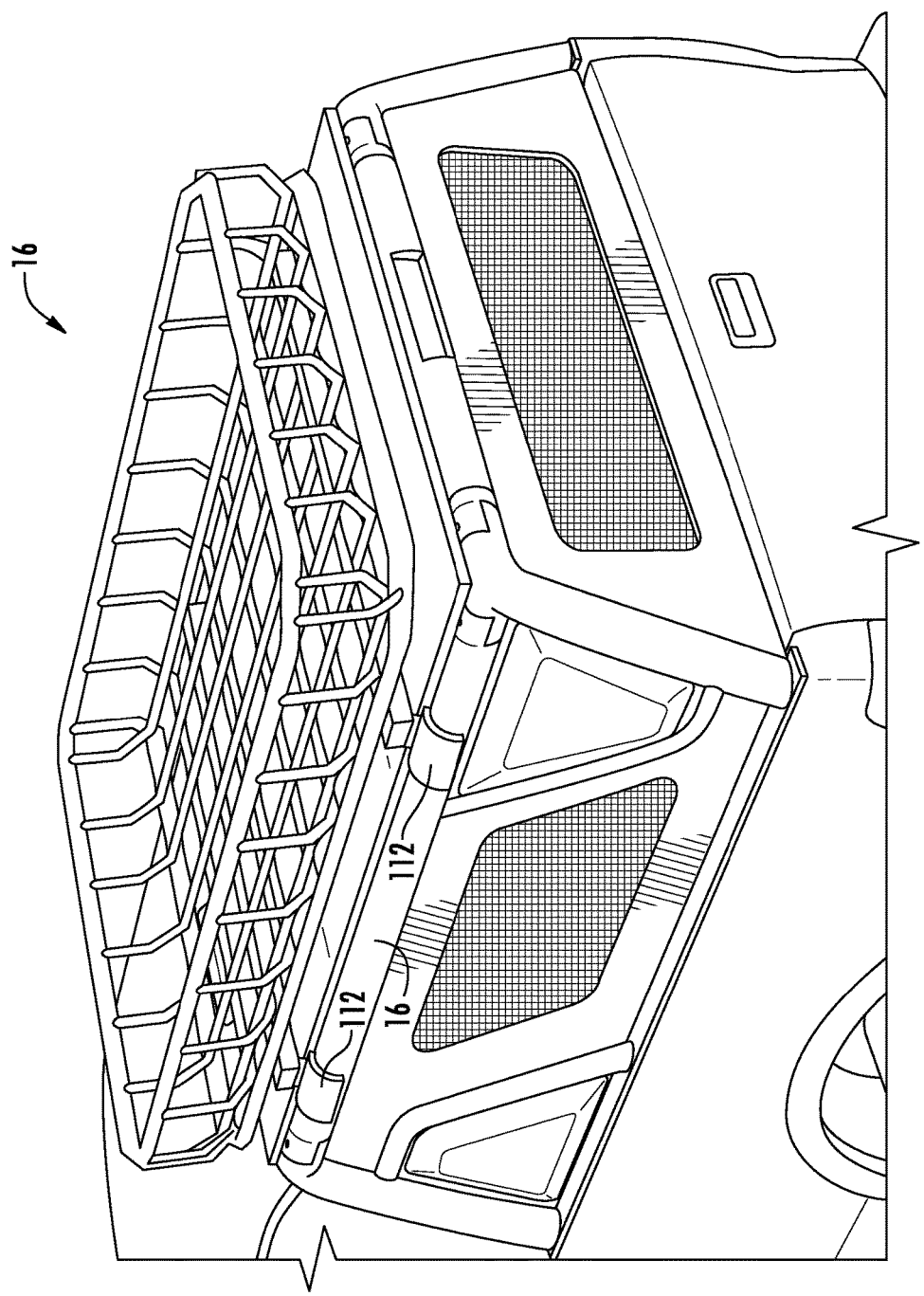
FIG. 16 illustrates the rack of FIG. 15 resting on the frame.
Figure 17:
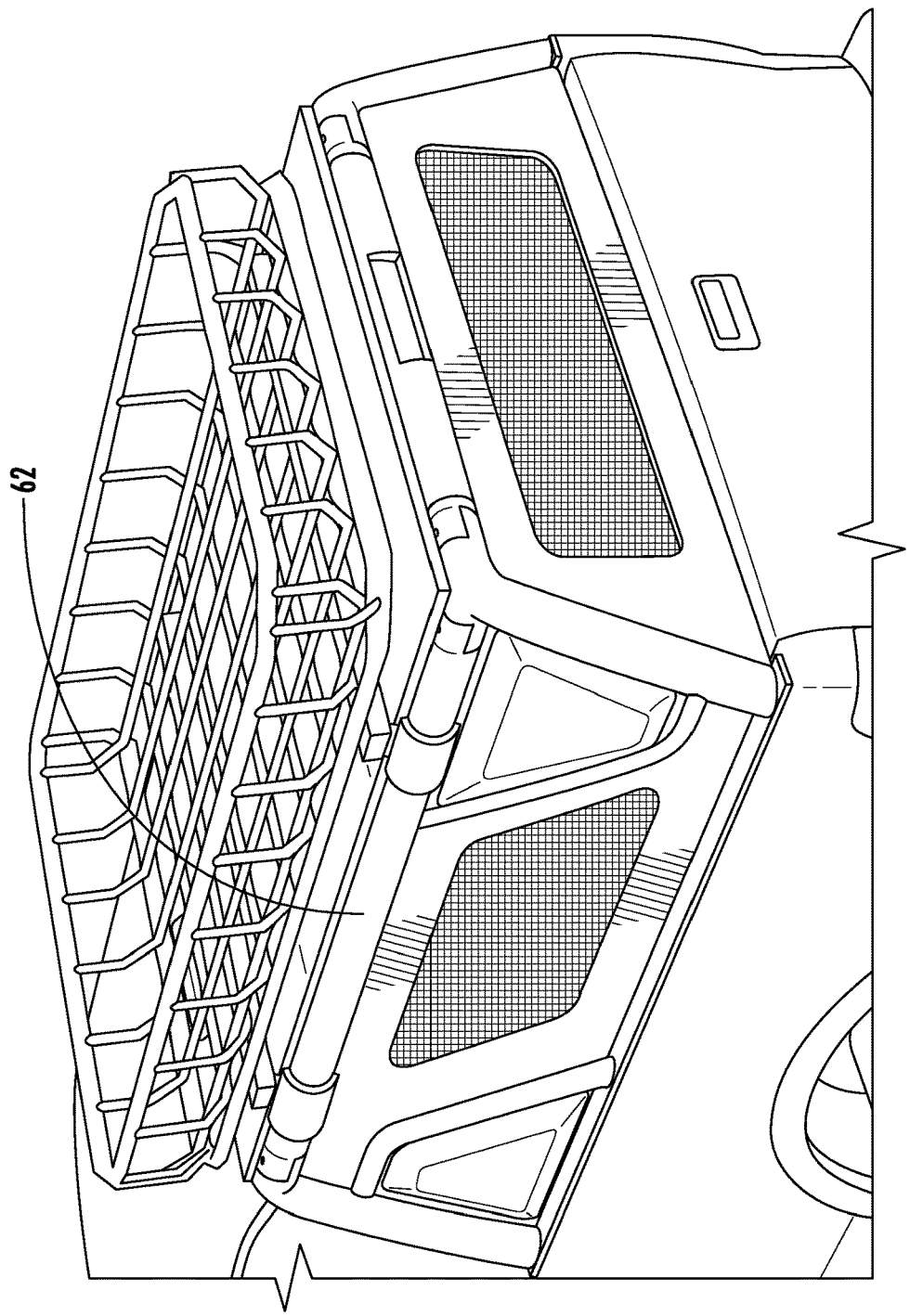
FIG. 17 illustrates the rack of FIG. 15 with clamps secured to the frame.

Referring now to FIGS. 15-18, the rack 16 may be secured to the driver and passenger longitudinal extension members 62, 64. In particular, the rack 16 may have clamps 112 that can be traversed between the released position, as shown in FIGS. 15-16 and an engaged position as shown in FIG. 17. With the clamps 112 in the released position, the clamps 112 are laid on top of the driver and passenger longitudinal extension members 62, 64 as shown in FIG. 16. The clamps 112 are then traversed (i.e. rotated) in order to clamp to the driver and passenger longitudinal extension members 62, 64.

Figure 18:
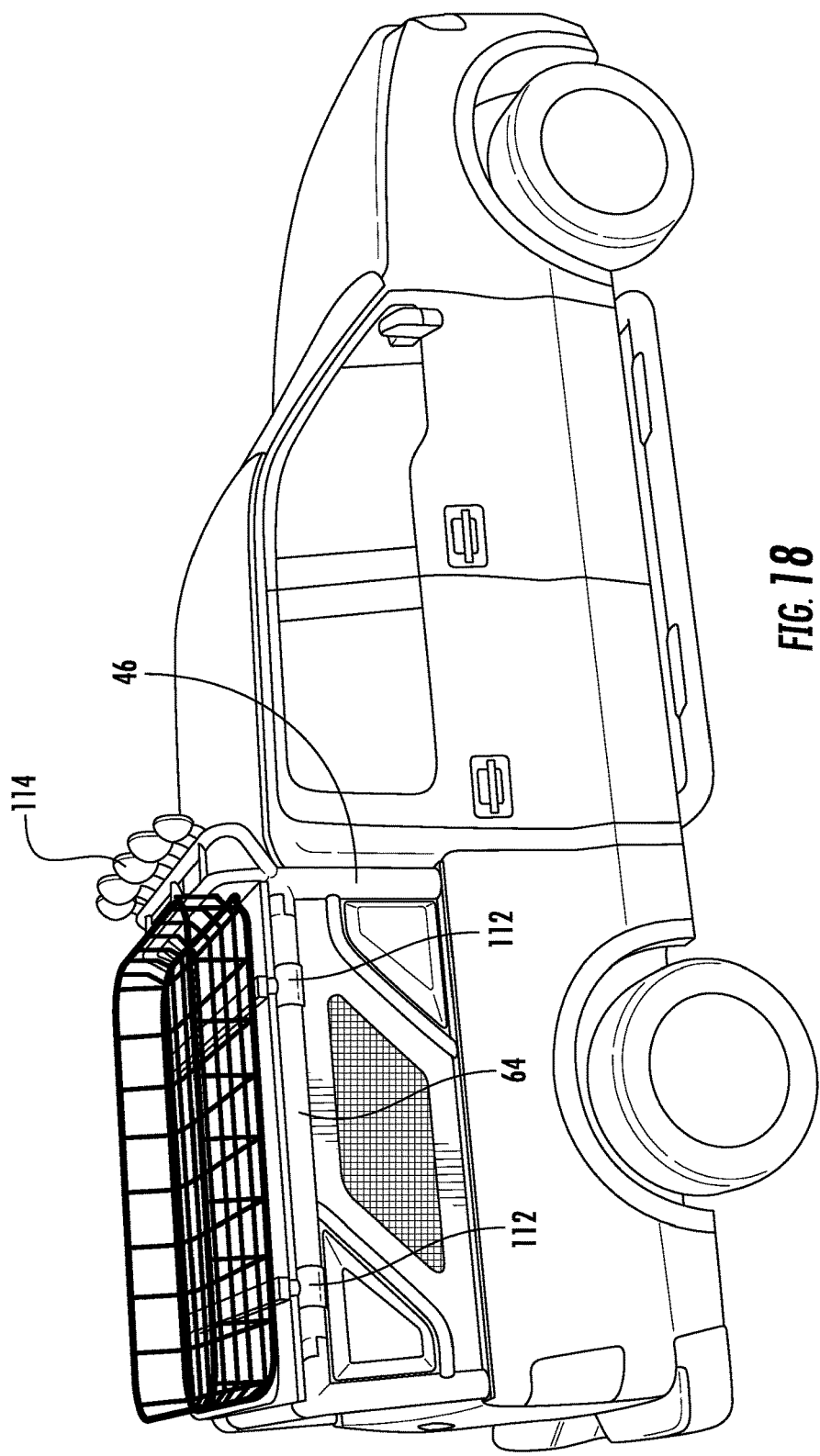
FIG. 18 illustrates front headlights mounted to the frame.

Additionally, in FIG. 18, flood lights 114 may be mounted to the frame 10, namely, the forward driver side and passenger side posts 44, 46 and/or the front crossmember 54.

Figure 19:
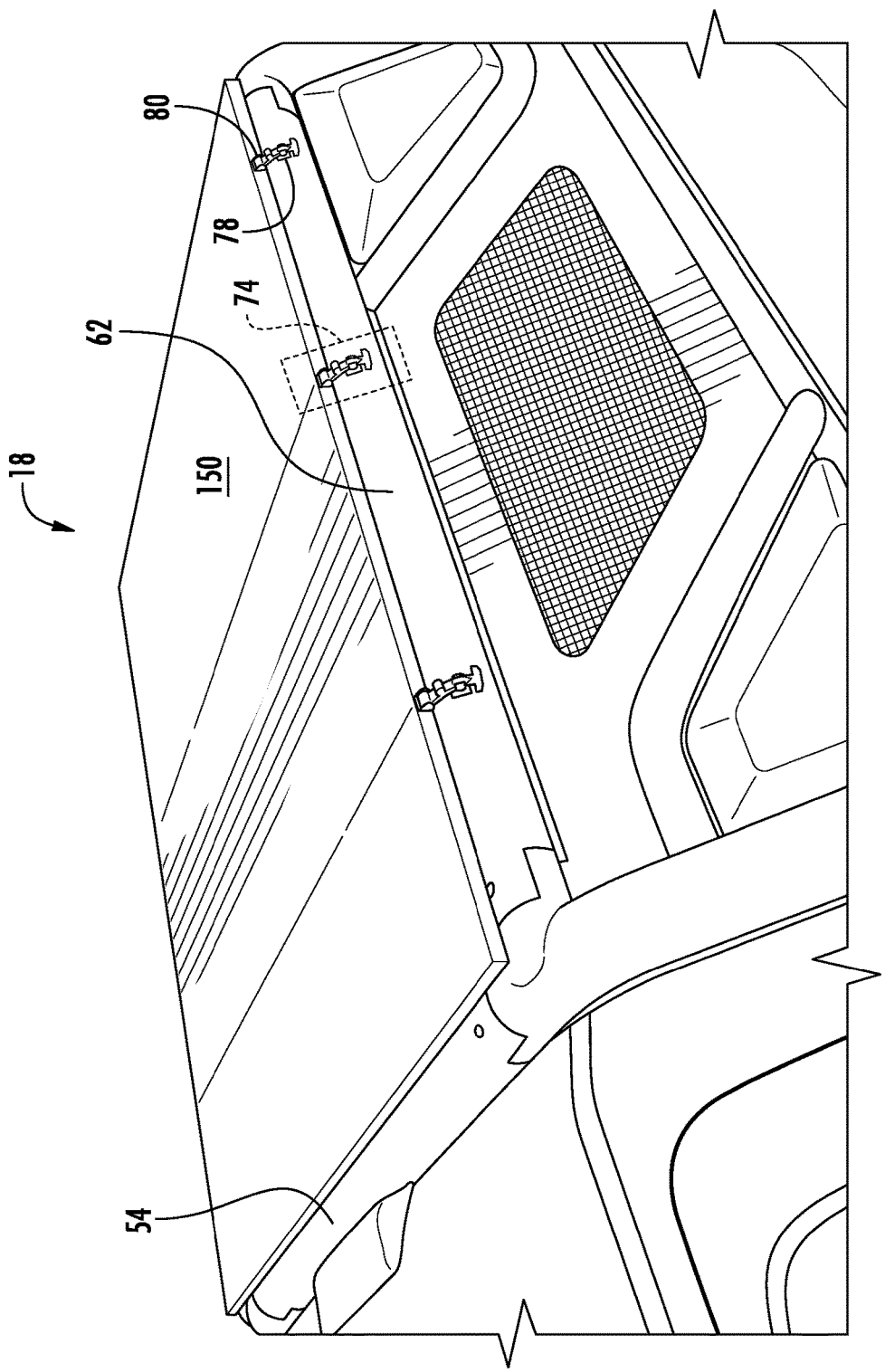
FIG. 19 illustrates a pop up top in a down position.
Figure 20:
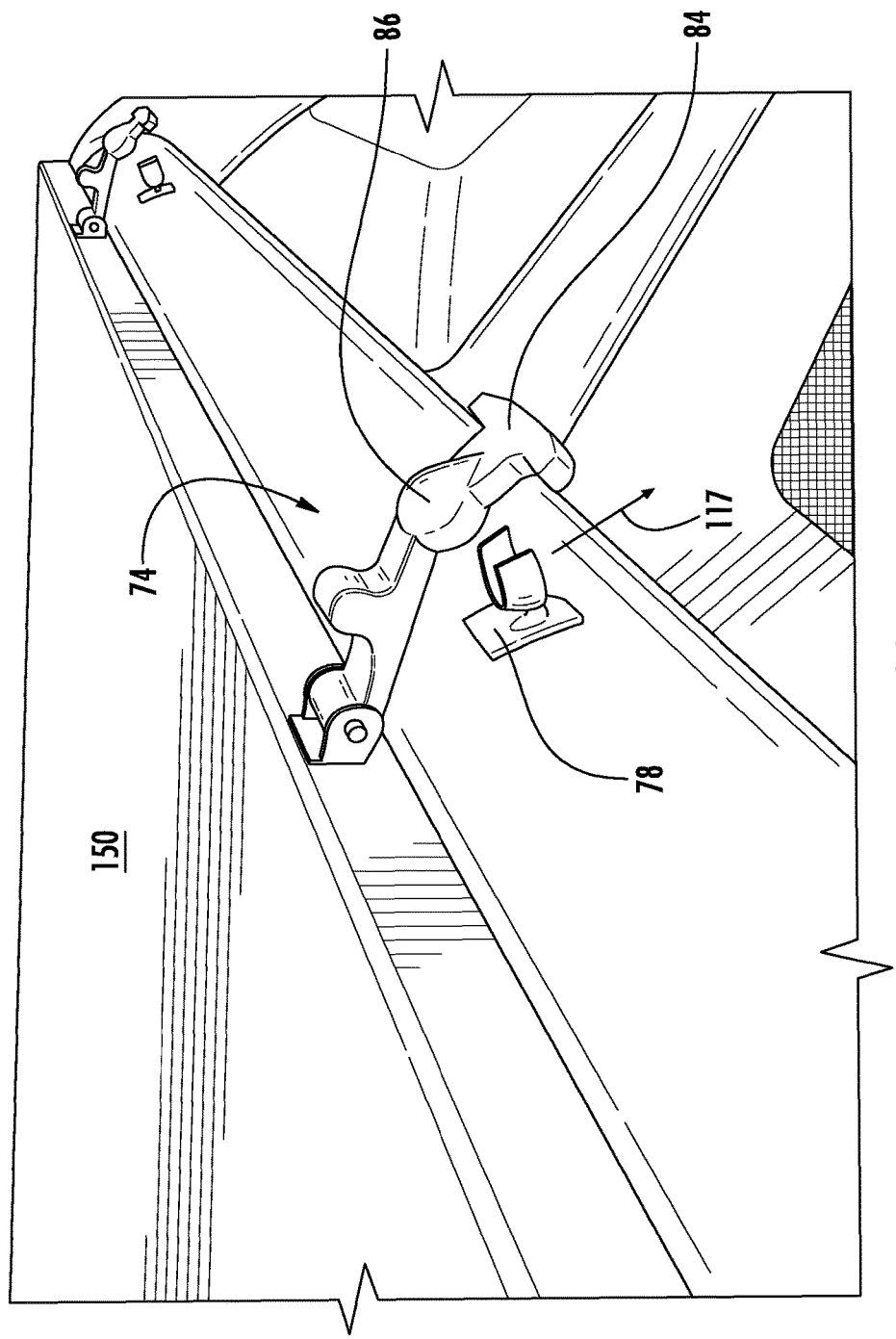
FIG. 20 illustrates rubber lockouts being disengaged so that the pop up top can be traversed to an up position.
Figure 21:
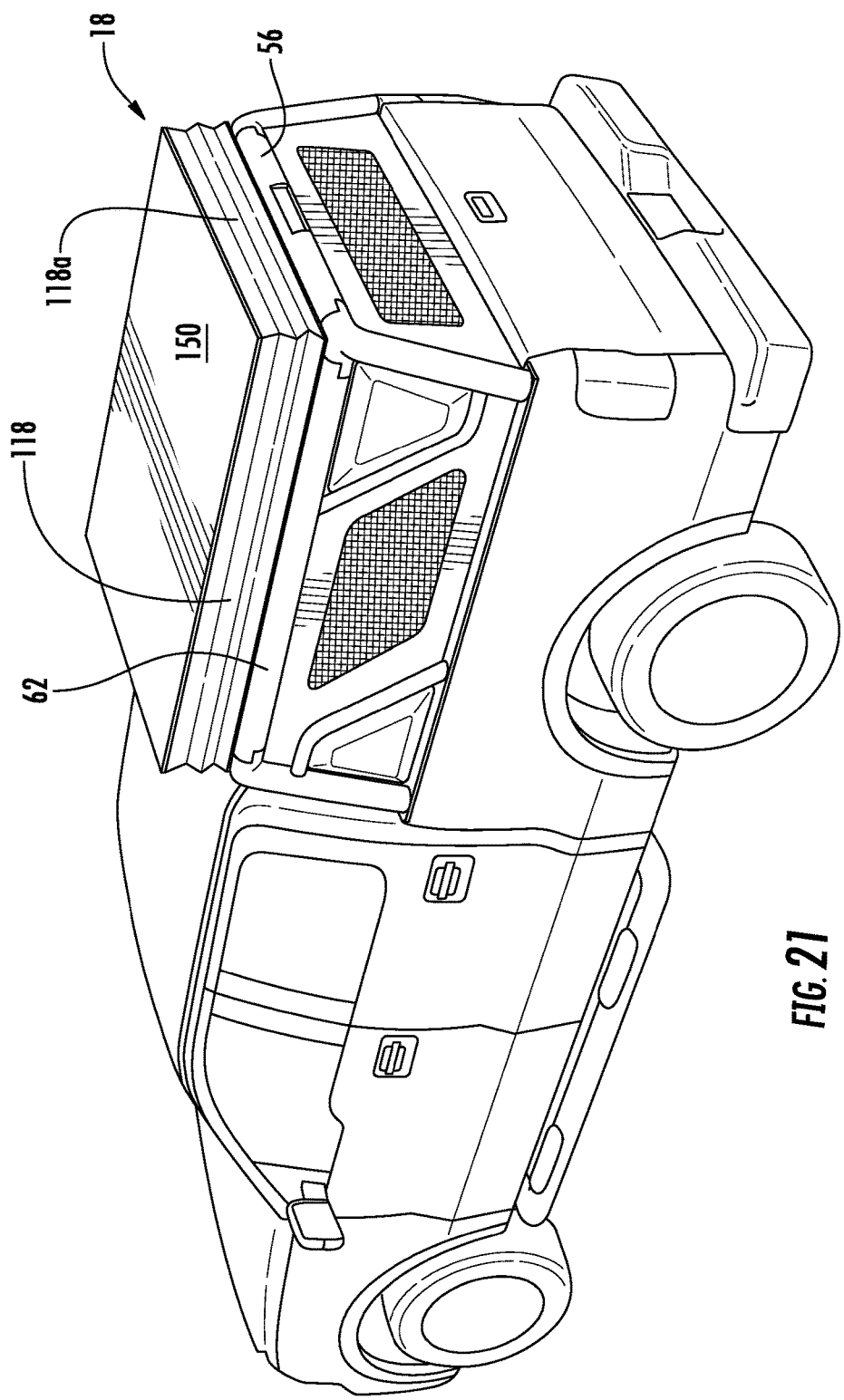
FIG. 21 illustrates the pop up top in the up position.

Referring now to FIGS. 19-22, a pop-up top 18 is shown. The pop-up top 12 may be extended upward, as shown in FIG. 21 so that the interior volume defined by the frame 10 may be enlarged in order to hold larger items within the truck bed 22. The pop-up top 18 may have a generally rigid top panel 150. The top panel 150 may be sufficiently large to cover the entire area from the front crossmember 54 to the rear crossmember 56 between the driver and passenger longitudinal extension members 62, 64. The top panel 150 of the pop-up top 18 is biased to the up position as shown in FIG. 21. In order to hold the top panel 150 in the down position which is shown in FIG. 19, the pop-up top 18 may include a plurality of rubber lockouts 74 around the periphery of the top panel 150.

The first part 78 may be attached to the driver and passenger longitudinal extension members 62, 64 and the front and rear crossmembers 54, 56. The second part 80 may be attached to the periphery of the top panel 150. In FIG. 19, the rubber lockouts 74 are shown as being only on the driver side of the top panel 150 but it is also contemplated that the rubber lockouts 74 may be disposed around the entire periphery so that one or more rubber lockouts 74 are on opposed sides of the top panel, specifically, the front and rear sides of the top panel 150 and/or the driver and passenger sides of the top panel 150.

Referring now to FIG. 20, the rubber lockout may be disengaged so that the top panel 150 can pop upward. By gripping the handle 84 and pulling downward in the direction of arrow 117, the enlarged portion 86 is removed from the first part 78. Once the enlarged part 86 clears the first part 78, the user releases the handle 84. All of the rubber lockouts 74 are disengaged so that the top panel 150 may be traversed upward. Additionally or alternatively, although not shown, rubber lockouts 74 may be placed on the inside or under the top panel 150 and on the interior of the frame 10. In this regard, the rubber lockouts 74 must be disengaged by having the user climb into the truck bed and disengage each of the rubber lockouts 74. The rubber lockouts 74 disposed on the inside may be placed about a periphery in the same manner as that of the rubber lockouts 74 disposed on the exterior side shown in FIGS. 19-20.

Figure 22:
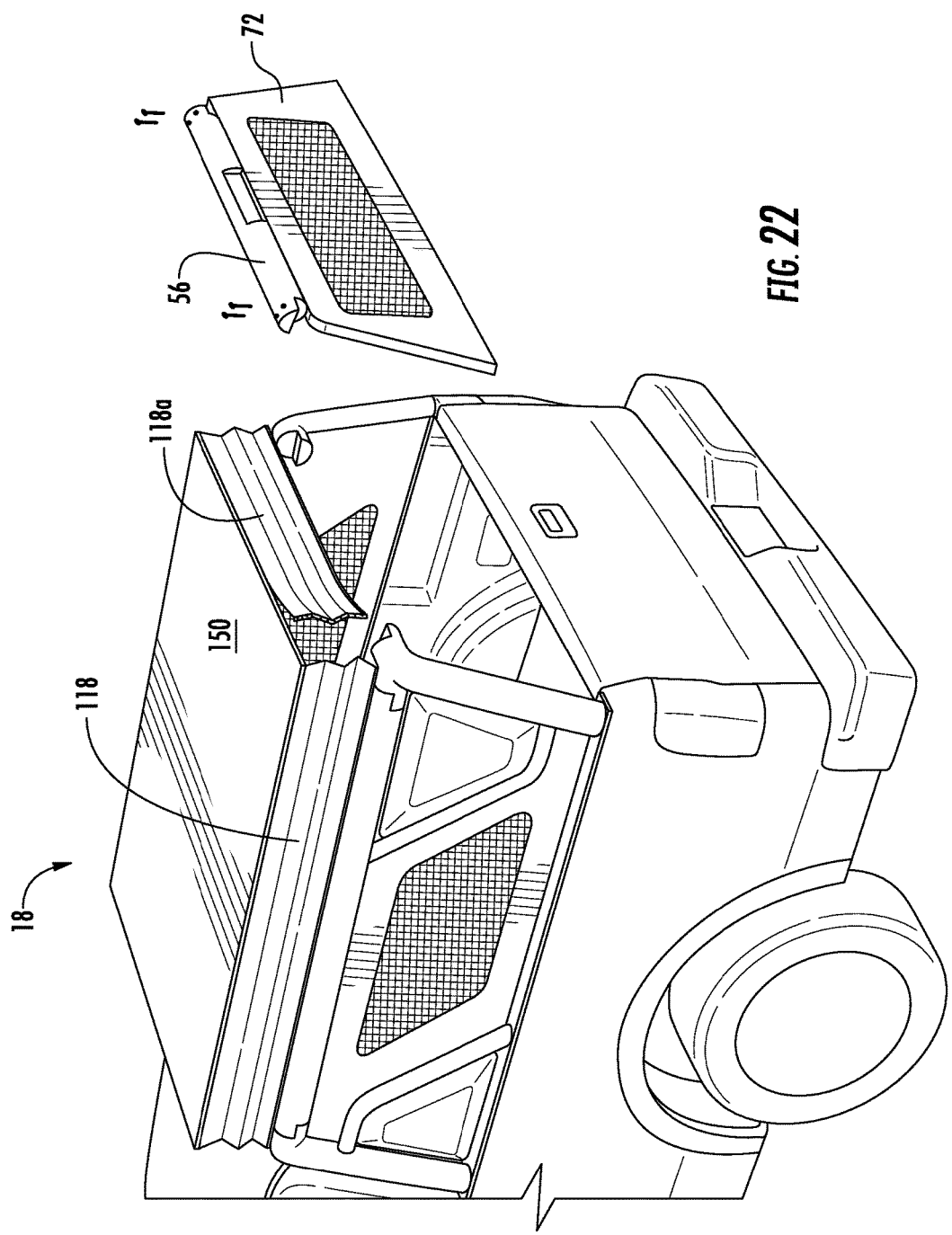
FIG. 22 illustrates how to open up the pop up top so that a motorcycle being higher than frame can fit within the truck bed.

Referring now to FIG. 21, the pop-up top 18 is shown. The top panel 150 is in the up position. In that up position, there are a plurality of pleated sides 118 about the entire periphery of the top panel 150 that extends from the top panel 150 to the front and rear crossmembers 54, 56 and the driver and passenger longitudinal extension members 62, 64. The pleated sides 118 and the top panel 150 enlarge the interior volume of the frame 210 so that, if needed, the truck bed 22 can fit a motorcycle. In order to fit the motorcycle, the pleated side 118a on the backside of the top panel 150 may be removed. In particular, as shown in FIG. 22, the pleated side 118a may be secured to the back edge of the top panel 150, the left and right pleated sides 118 and the rear crossmember 56 through any connection mechanism including but not limited to hooks and loops, snaps and other fastening mechanisms known in the art. In order to fit a motorcycle into the truck bed, the pleated side 118 may be removed as well as the rear crossmember 56 and the rear hatch 72. The motorcycle may be placed in the truck bed 22 then the pleated side 118a and the rear crossmember 56 and rear hatch 72 may be mounted back onto the pop-up top 18 and the frame 10. Instead of removing the pleated side 118a, the short left and right vertical sides may be removed from the driver side and passenger side pleated sides 118. Also, the bottom of the pleated side 118 may be removed from the rear crossmember 56. The pleated side 118a may be flipped up and over so that it rests on top of the top panel.

Figure 24:
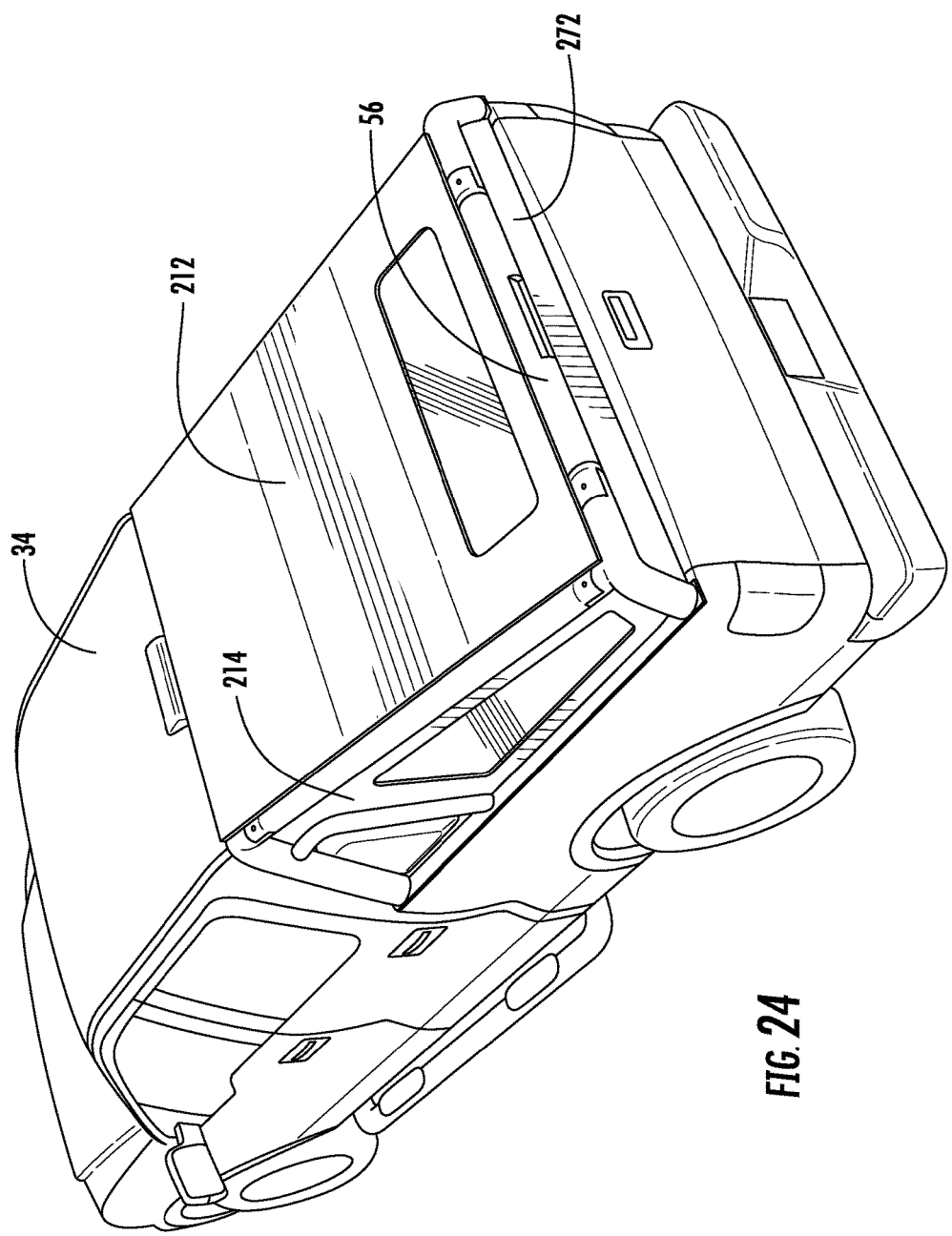
FIG. 24 illustrates the second embodiment shown in FIG. 23 with the foldable top and removably attachable side panels.
Figure 25:
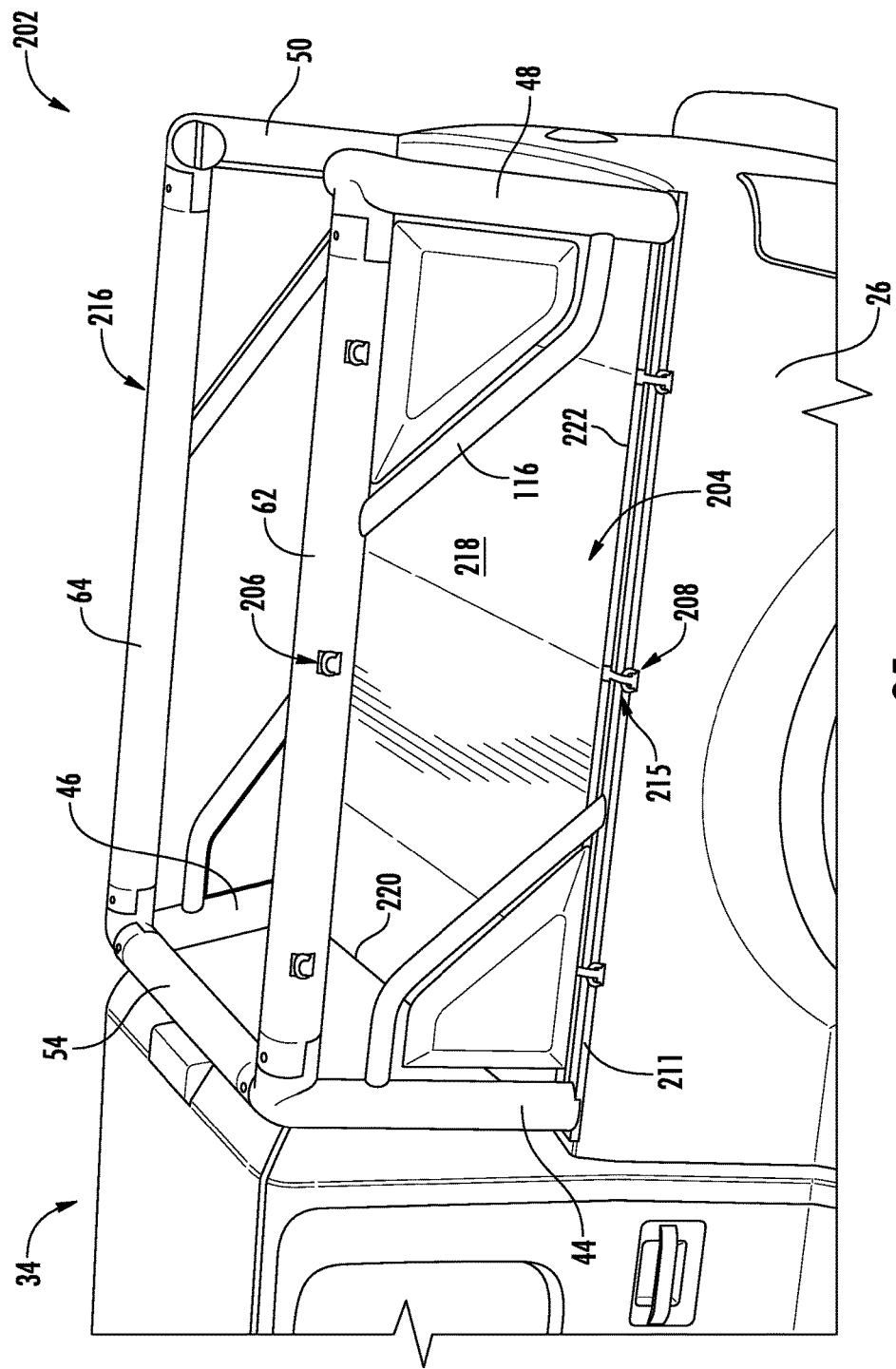
FIG. 25 is an upper perspective view of another embodiment of a truck bed cover.

Referring now to FIGS. 23-25, a second embodiment of the frame 210 is shown. In particular, the frame 210 may have a shortened rearward driver side and passenger side posts 248, 250. The rearward driver side and passenger side posts 48, 50 as well as the forward driver side and passenger side posts 44, 46 may extend up to about a height of the cab 34. In the frame 210, the forward driver side and passenger side posts 44, 46 may still come up to about the height of the cab 34 but the rearward driver side and passenger side posts 248, 250 may be about one half or less of the height of the forward driver side and passenger side posts 44, 46. The driver and passenger longitudinal extension members 262, 264 may extend backwards and slope downward as shown in FIG. 23. The second embodiment of the frame 210 illustrates a different configuration from that of the frame 10 to illustrate that the frame may have different configurations but nevertheless can form an enclosed volume as shown in FIG. 24 in the truck bed but also allow the side panels 214 to be removably attachable to the frame 210 in the same manner as that described in relation to the frame 10. Additionally, the top 212 and the rear hatch 272 may be foldable and stored on top of the cab for the same manner as that described in relation to frame 10.

The various accessories (e.g. foldable top, pop-up top, rack, floodlights, side panels) that are multiple to the frame 10 may also be configured to be used in relation to the frame 210. By way of example and patient, the top 212 may be stored above the cab 34 and held over the cab with rubber lockouts 74. This is the stored position of the top 212. The deployed position in order to form the enclosure is shown in FIG. 24. A pop-up top may be void on the frame 212. Instead of being traversed vertically up as shown in FIG. 21, the pop-up top employed on the frame 210 will be traversed upward at an angle defined by the driver and passenger longitudinal extension members 262, 264. The rack may be attached to the driver and passenger longitudinal extension members 262, 264 in the same manner described above in relation to frame 10. Likewise, floodlights may be mounted to the frame 210 in the same manner described above in relation to frame 10. Additionally, side panels may be shaped to the size of the frame 210 and the side panels may be mounted to the frame 210 in the same manner described above in relation to the frame 10.

The frames may have triangular reinforcement bars 116 that extend from forward driver side posts to the subframe 52, from the forward passenger side posts 46 to the subframe 52, from the driver longitudinal extension member 62 to the rear driver side post 48 and from the passenger longitudinal extension member 64 to the rear passenger side post 50. The triangular reinforcement bar 116 adds rigidity to the frame 10, 210.

The top and side panels may form a waterproof seal along with the front cross member, rear cross member and the driver and passenger longitudinal extension members with a gasket placed around a section or the entire periphery of the top and panels 14. The gasket may be an elongate rubber piece that mates with both the top and side panels and the front cross member, rear cross member and the driver and passenger longitudinal extension members. The weight of the top may press down on the gasket to form the watertight seal. Also, the rubber lockouts may place downward pressure from the top onto the gasket to further ensure the watertight seal. Other means of forming the waterproof seal are also contemplated such as the means explained in relation to FIGS. 10 and 11. Moreover, the side panels 14 may form a waterproof seal with the forward and rearward driver side posts and the forward and rearward passenger side posts with a gasket disposed between the side panels and the forward and rearward driver side posts and the forward and rearward passenger side posts. Other means of forming the waterproof seal are also contemplated such as the means explained in relation to FIGS. 10 and 11. In particular, the interconnection shown in FIGS. 10 and 11 may be formed between the panel and the forward and rearward driver side posts and the forward and rearward passenger side posts as well as the subframe 52.

Figure 26:
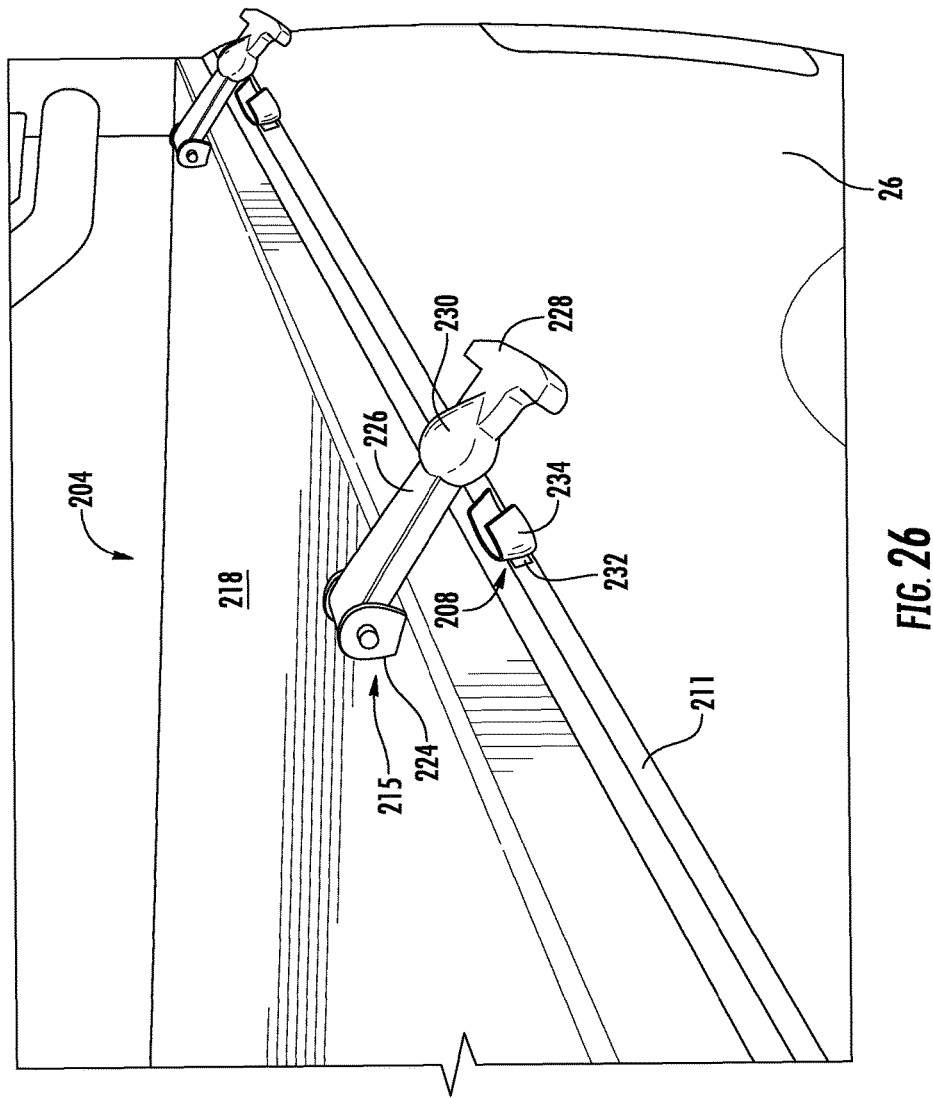
FIG. 26 is an enlarged view of one example of connectors used on the truck bed cover depicted in FIG. 25.
Figure 27:
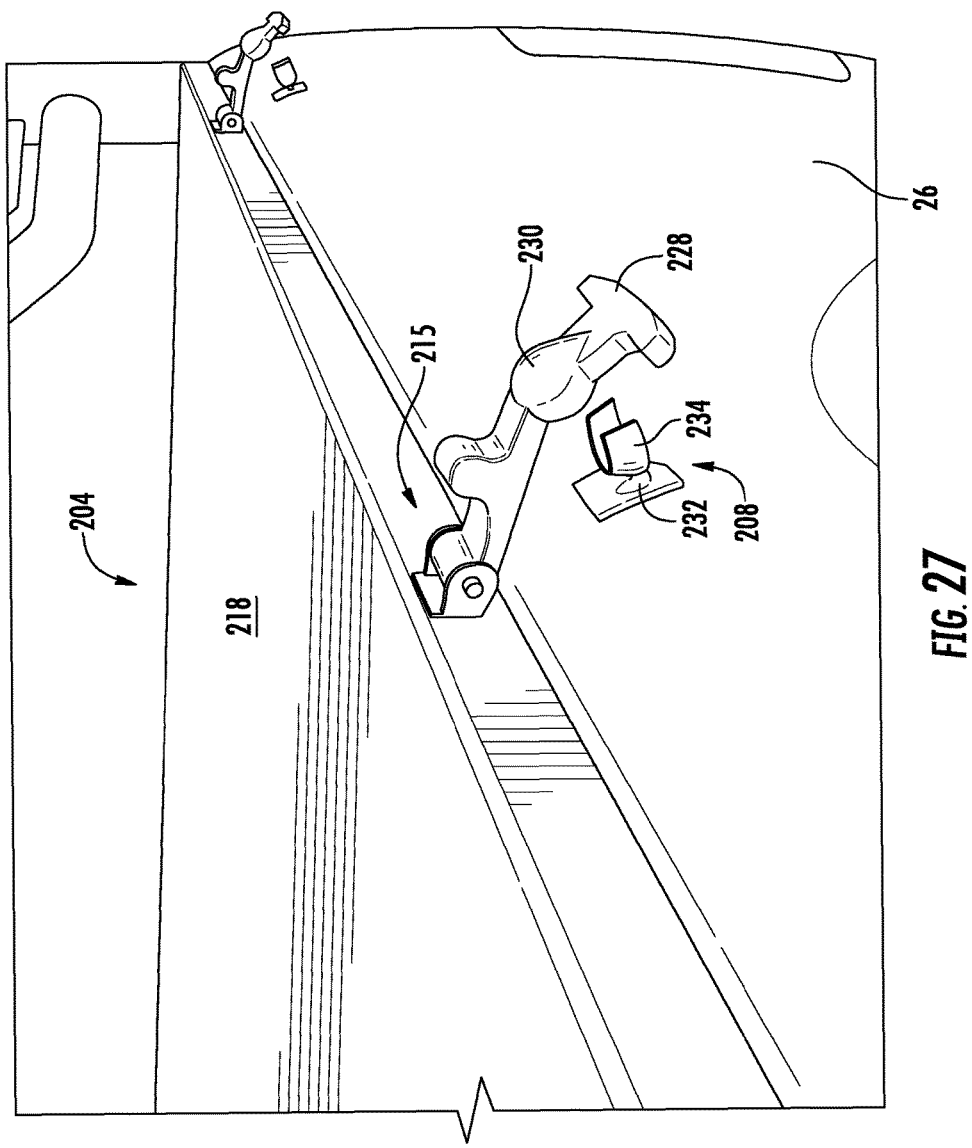
FIG. 27 is an enlarged view of another example of connectors used on the truck bed cover depicted in FIG. 25.

Referring now to FIGS. 25-27, there is depicted another embodiment of a truck bed cover 202, which may define an enclosure over the truck bed 22. The truck bed cover 202 may be adaptable to allow for variation in the size of the enclosure defined by the truck bed cover 202. In this regard, the truck bed cover 202 may include a top 204 which may be selectively transitioned between an upper position and a lower position to vary the size of the enclosure defined by the truck bed cover 202, wherein the upper position may be associated with a larger enclosure, while the lower position may be associated with a smaller enclosure. This adaptability may be implemented via identically configured connectors 206, 208, which may be located along upper longitudinal members 62, 64 and lower longitudinal members 211 extending over the sidewalls of the truck bed 22. The top 204 may include complimentary connectors 215, which may be selectively engaged with the upper connectors 206 on the upper longitudinal members 62, 64 to deploy the truck bed cover 202 in the upper position, or the lower connectors 208 on the lower longitudinal members 211 to deploy the truck bed cover 202 in the lower position.

In more detail, the truck bed cover 202 includes a pair of support frames 216 which are engageable with the truck bed 22 in opposed relation to each other. One frame support 216 may be on the driver's side and includes side posts 44, 48, as well as upper longitudinal member 62 and lower longitudinal member 211. Frame support 218 may be on the passenger's side and includes side posts 46, 50, as well as upper longitudinal member 64 and lower longitudinal member 211. The lower longitudinal members 211 may extend along the upper ends of the truck bed sidewalls between respective sets of the side posts 44, 48 on the driver's side and the side posts 46, 50 on the passenger's side. The lower longitudinal members 211 may be secured to the sidewalls via rivets, screws, adhesives, or other fasteners known in the art. The lower longitudinal members 211 may be in parallel relation to the upper longitudinal members 62, 64, or there may be non-parallel relationship between the lower longitudinal members 211 and the upper longitudinal members 62, 64. For instance, the upper longitudinal members 62, 64 may be angled downwardly from the rear of the cab toward the tailgate, similar to the configuration shown in FIG. 23.

The top 204 generally includes a top panel 218, and a plurality of panel connectors 215 coupled to the top panel 218. The top panel 218 may include a pair of transverse edges 220 (i.e., forward and rearward edges) and a pair of longitudinal edges 222 extending between the transverse edges 220. The top panel 218 may be a flexible panel, or a rigid panel. In the case of a flexible panel, the top panel 218 may include several regions or sections separated by fold lines to facilitate folding of the top panel 218 for storing the top 204. In one particular implementation, the top panel 218 may be folded to allow the top panel to be easily stowed within the cab of the truck. The flexible top panel 218 may be comprised of a fabric material, or other materials capable of defining fold lines therein. Alternatively, the flexible top panel 218 may be formed from a more rigid material, such as plastic, fiberglass, or the like, with the panel 218 being comprised of separate sections which are connected to each other via one or more hinges so as to facilitate folding of the top panel 218. A rigid top panel 218 may be generally inflexible, i.e., incapable of folding onto itself. The rigid top panel 218 may be formed from plastic, fiberglass, metal, rubber, or other materials known in the art.

The connectors 215 may be coupled to the top panel 218 adjacent the longitudinal edges 222 thereof. In the exemplary embodiment, the top 204 includes three connectors 215 positioned adjacent each longitudinal edge 22, with the spacing between the connectors 215 being substantially equal. However, it is understood that the number of connectors 215 and the spacing therebetween may be varied without departing from the spirit and scope of the present disclosure. Each connector 215 may include a stationary part 224 and a rubber extension member 226 pivotally secured to the stationary part 224. The rubber extension member 226 may have a handle 228 that can be grasped to stretch the rubber extension member 226 so that an enlarged portion 230 can be pulled out of a corresponding connector 206, 208 to dislodge the enlarged portion 230 of the rubber extension member 226 out of the corresponding connector 206, 208. It is contemplated that the extension member 226 may be formed from materials other than rubber, such as plastic, metal, etc.

The upper connectors 206 attached to the upper longitudinal members 62, 64, as well as the lower connectors 208 attached to the lower longitudinal members 211, may be complimentary to the panel connectors 215 coupled to the top panel 218. In this respect, the upper and lower connectors 206, 208 may be referred to herein as "primary connectors," while the panel connectors 215 may be referred to herein as "secondary connectors." According to one embodiment, the upper connectors 206 and lower connectors 208 may be identical in configuration. As shown in the exemplary embodiment, the upper and lower connectors 206, 208 may include a shaft portion 232 and a cup portion 234 at a distal end of the shaft portion 232. The cup portion 234 may be adapted to receive the enlarged portion 230 of the rubber extension member 226 so as to secure the connector 206, 208 to the panel connector 215. In this respect, the cup portion 234 may be resilient to allow the cup portion 234 to expand as the rubber extension member 226 is inserted therein and removed therefrom. The resiliency may also allow the cup portion 234 to apply a compressive force on the rubber extension member 226 to retain the rubber extension member 226 within the cup portion 226. Such resiliency may be referred to as "snap-fit engagement" between the cup portion 234 and the panel connector 215.

Although the foregoing description and related figures show the panel connectors 215 as including the pivotable rubber extension members 226, and the upper and lower connectors 206, 208 as including the complimentary cup portion 234, it is understood that the configuration of the connectors may be reversed. For instance, the panel connectors 215 may include the cup portion 234, while the upper and lower connectors 206, 208 may include the pivotable rubber extension members 226. Furthermore, it is understood that other complimentary connectors may be used without departing from the spirit and scope of the present disclosure. Along these lines, the primary connectors 206, 208 and secondary connectors 215 may include snaps, buttons, zippers, hook and loop fasteners, magnets, or other fasteners known in the art for securing the top panel 218 in place.

Although the foregoing describes the lower connectors 208 as being connected to the lower longitudinal members 211, it is contemplated that the lower connectors 208 may be connected directly to the sidewalls of the truck bed, as shown in FIG. 27. As such, the position of the lower connectors 208 is not limited to being directly connected to the lower longitudinal members 211. The lower connectors 208 may be coupled to the sidewalls of the truck bed via adhesives, magnets, rivets, screws, or other fasteners known in the art.

In use, the top 204 may be selectively transitioned between several different positions to allow the truck bed cover 202 to assume several different operable configurations. The top 204 may be placed in a first deployed position, or an upper position, by connecting the top 204 to the upper longitudinal members 62, 64 (see FIGS. 19 and 20). When the top 204 is in the first deployed position, the panel connectors 215 are engaged with the upper connectors 206, and disengaged from the lower connectors 208. By placing the top 204 in the first deployed position, the truck bed cover 204, including the side panels 14 discussed in more detail above, may define a large enclosure. In the first deployed position, the top panel 218 may be spaced upwardly from the sidewalls of the truck bed and the top of the tailgate. At least a portion of the top panel 218 may reside in a plane that is substantially parallel to the roof of the cab. When the side panels 14 are used for forming part of the enclosure, it is contemplated that the side panels 14 may be connected to an inner periphery of the corresponding support frame 216. In this regard, the "inner periphery" refers to any portion of the upper longitudinal members 62, 64 and the lower longitudinal members 211 to which the side panels 14 may be attached, while still allowing at least a portion of the upper and lower longitudinal members 62, 64, 211 to be exposed to create the appearance of a robust exoskeleton. As such, the "inner periphery" of the upper longitudinal members 62, 64 may broadly include any part of the lower hemisphere or lower half of the upper longitudinal members 62, 64, as well as any part of the inner hemisphere or inner half of the upper longitudinal members 62, 64. Likewise, the "inner periphery" of the lower longitudinal members 211 may broadly include any part of the upper hemisphere or upper half of the upper longitudinal members 211, as well as any part of the inner hemisphere or inner half of the lower longitudinal members 211.

The top 204 may be placed in a second deployed position, or lower position, by connecting the top 204 to the lower longitudinal members 211. When the top 204 is in the second deployed position, the panel connectors 215 are engaged with the lower connectors 208, and disengaged from the upper connectors 206. By placing the top 204 in the second deployed position, the truck bed cover 204 may extend over the truck bed in close proximity to the top of the sidewalls of the truck bed, as well as the top of the tailgate to define a smaller enclosure relative to the size of the enclosure when the top 204 is in the first deployed position.

The top 204 may assume a third deployed position, similar to the second deployed position, wherein the panel connectors 215 are engaged with lower connectors 208 on the sidewalls of the truck bed. In this regard, the support frame used to support the top panel 218 in the first deployed position may be removed from the truck bed, including the posts 44, 46, 48, 50, the upper longitudinal members 62, 64, and the lower longitudinal members 211.

By moving the top 204 from the first deployed position to the second deployed position or third deployed position, the top 204 may be lowered by a distance which is substantially equal to the height 36 of the cab 34. Conversely, by moving the top 204 from the second deployed position, or third deployed position, to the first deployed position, the top 204 may be raised by a distance which is substantially equal to the height 36 of the cab 34.

In addition to the first and second deployed positions, the top 204 may be transitioned to a disengaged position, by disconnecting the panel connectors 215 from the upper connectors 206 and the lower connectors 208. After such disconnections are made, the top 204 may be removed from the truck bed, leaving the truck bed uncovered. By uncovering the truck bed, tall items which may extend well above the cab, such as motorcycles, may be placed in the truck bed. As such, use of the truck bed cover 202 does not limit use of the truck bed. Rather, the truck bed cover 202 enhances use of the truck bed by providing an enclosure which may be selectively deployed and sized as needed.

When the top 204 is disengaged from the truck bed, the top panel 218 may be folded and stored in the cab of the truck, or in another location outside of the truck, such as in a garage or storage closet. In this respect, the top panel 218 may be formed of sections or sub-panels, which may facilitate folding of the top panel 218. It is also contemplated that other ways of allowing the top panel 218 to assume a smaller configuration, such as rolling the top panel 218, may also be used.

Figure 28:
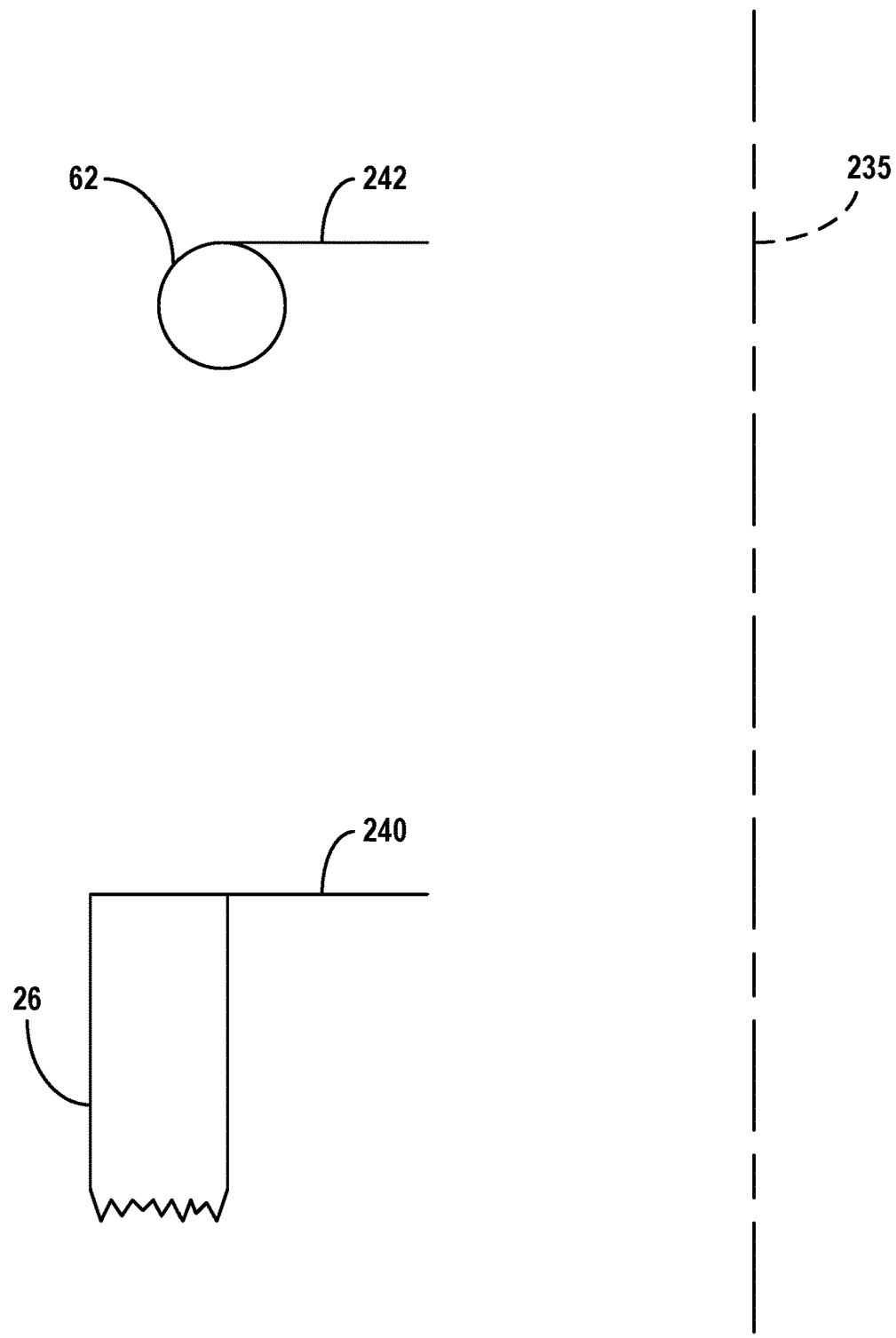
FIG. 28 is a schematic, cross sectional representation of a truck bed capable of selectively supporting a truck bed cover in a raised position and a lowered position.

The configuration of the top 204 provides enhanced adaptability that allows the owner to remount the top 204 in several different positions, depending on the space that is needed in a given time. Furthermore, the top 204 may form a part of all types of tonneau covers, including folding-panel-type tonneau covers, roll up tonneau covers, hinging tonneau covers, or other types of tonneau covers known in the art. Along these lines, FIG. 28 is a schematic, cross sectional representation of a truck bed capable of selectively supporting the top of a truck bed cover in a lowered position and a raised position. Only one side of the truck bed is shown in FIG. 28, with the opposing side being symmetrical about axis 235. When in the lowered position, the top 204 may be supported by a lower support 240 connected to a respective sidewall 26, 28 of the truck bed 22. When in the raised position, the top 204 may be supported by an upper support 242 connected to a respective longitudinal extension member 62, 64. The lower and upper supports 240, 242 may be configured to accommodate the specific type of top included in a particular tonneau cover.

For a roll up tonneau cover, the lower and upper supports 240, 242 may include side rails which may support a top 204 having a rear bar, front bar, support bows, and a cover panel. An exemplary roll up tonneau cover is the Original Slantback® Roll-Up Cover sold by Access®, which is a division of AGRI-COVER, INC. in Jamestown, N. Dak. For more detail regarding roll up tonneau covers, please refer to the INSTALLATION INSTRUCTIONS for the Original Slantback® Roll-Up Cover by Access®, which are expressly incorporated herein by reference.

For a tri-fold tonneau cover, the lower and upper supports 240, 242 may include structures which may interface with clamps or other mounting hardware on the tri-fold tonneau cover. An exemplary soft tri-fold tonneau cover is the Tri-Fold Tonneau Cover sold by American Tonneau Company™, located in Ann Arbor, Mich. An exemplary hard tri-fold tonneau cover is the Hard Tri-Fold Tonneau from Rugged Cover™, located in Owosso, Mich. It is understood that tri-fold tonneau covers may clamp onto slide bracket assemblies that slide within channels formed in the truck bed. In this regard, it is contemplated that the lower and upper supports 240, 242 may also include channels for support such slide bracket assemblies. As an alternative, it is contemplated that the upper and lower supports 240, 242 may integrate the structure associated with the slide bracket assemblies that interface with clamps on the tonneau cover. For more information regarding tri-fold tonneau covers, please refer to the TRI-FOLD TONNEAU INSTALLATION GUIDE for the American Tonneau Company Tri-Fold Tonneau Cover, as well as the HARD TRI-FOLD TONNEAU INSTALLATION INSTRUCTIONS for the Rugged Cover Hard Tri-Fold Tonneau, the contents of each of which are expressly incorporated herein by reference.

For a retractable tonneau cover, the lower and upper supports 240, 242 may include rails which slidably support the tonneau top. Exemplary retractable tonneau covers include the JackRabbit™ series of tonneau covers, sold by Pace Edwards located in Centralia, Wash. For more information regarding retractable tonneau covers, please refer to the STANDARD INSTALLATION INSTRUCTIONS for the JackRabbit™ series.

For hard tonneau covers, the lower and upper supports 240, 242 may include mounting brackets to support hydraulic struts used to facilitate pivotal movement of the tonneau cover. In this regard, it is contemplated that the truck bed frame 210 may allow a hard tonneau cover may be pivotally mounted in two positions over the truck bed, i.e., a lowered position and a raised position. Exemplary hard tonneau covers include the Model 1010 tonneau cover sold by UnderCover™ located in Rogersville, Mo., as well as the Ridgelander™ DF921019, also sold by UnderCover™. For more information regarding hard tonneau covers, please refer to the TONNEAU INSTALLATION GUIDE for the UnderCover™ Model 1010 tonneau cover, as well as the INSTALLATION GUIDE for the Ridgelander™ DF921019, the contents of both being expressly incorporated herein by reference.

It is contemplated that tonneau covers may be sectioned so as to include different panels. For instance, a sectional tonneau cover may include a tailgate panel, and a cab & T panel. It is also contemplated that a sectional tonneau cover may include cab panel, a center panel and a tail panel. Exemplary sectional tonneau covers may include the Diamondback 270 tonneau cover, as well as the Diamondback HD SE tonneau cover, both being sold by DiamondBack located in Philipsburg, Pa. For sectional tonneau covers, the lower and upper supports 240, 242 may include brackets or other structures which interface with clamps on the tonneau cover. For more information regarding sectional tonneau covers, please refer to the INSTALLATION GUIDE for the Diamondback 270 tonneau cover, as well as the INSTALLATION GUIDE for the Diamondback HD SE cover, the contents of both being expressly incorporated herein by reference.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A truck bed cover for a truck bed, the truck bed cover comprising:
   a pair of side posts disposable adjacent respective forward corners of the truck bed so as to extend vertically upward from the truck bed and terminate at a respective top end at least about a height of the cab;
   a first pair of longitudinal extension members extending from respective ones of the pair of side posts;
   a second pair of longitudinal extension members extending from respective ones of the pair of side posts in spaced relation to the first pair of longitudinal extension members;
   a first pair of primary connectors connected to respective ones of the first pair of longitudinal extension members and disposed adjacent to an upper half of the pair of side posts;
   a second pair of primary connectors connected to respective ones of the second pair of longitudinal extension members and disposed adjacent to a lower half of the pair of side posts; and
   a top having:
      a top panel defining a flat plane; and
      a pair of secondary connectors coupled to the top panel;
   the top being transitional between a first deployed position, and a second deployed position, in the first deployed position, the pair of secondary connectors are coupled to respective ones of the first pair of primary connectors and the flat plane defined by the top panel is horizontally disposed at the upper half of the pair of side posts, and in the second deployed position, the pair of secondary connectors are coupled to respective ones of the second pair of primary connectors and the flat plane defined by the top panel is horizontally disposed at the lower half of the pair of side posts.

2. The truck bed cover of claim 1, wherein the first pair of primary connectors are identical to the second pair of primary connectors.

3. The truck bed cover of claim 1, wherein the first pair of longitudinal extension members extend from respective ones of the pair of side posts adjacent the top ends thereof.

4. The truck bed cover of claim 3, wherein each of the pair of side posts includes a bottom end opposite the top end, and the second pair of longitudinal extension member extend from respective ones of the pair of side posts adjacent the bottom end thereof.

5. The truck bed cover of claim 4, wherein the first pair of longitudinal extension members are parallel to the second pair of longitudinal extension members.

6. The truck bed cover of claim 1, wherein each of the pair of secondary connectors include a portion pivotable relative to the top panel.

7. The truck bed cover of claim 1, wherein the pair of secondary connectors are selectively engageable with the first pair of primary connectors and the second pair of primary connectors via snap-fit engagement.

8. The truck bed cover of claim 1, wherein a portion of the first set of primary connectors is resilient.

9. A truck bed cover for a truck bed, the truck bed cover comprising:
   a pair of side posts disposable adjacent respective forward corners of the truck bed so as to extend vertically upward from the truck bed and terminate at a respective top end at least about a height of the cab;
   a pair of longitudinal extension members extending from respective ones of the pair of side posts;
   a first pair of primary connectors connected to respective ones of the pair of longitudinal extension members and disposed adjacent to an upper half of the pair of side posts;
   a second pair of primary connectors positionable at respective portions of the truck bed and disposed adjacent to a lower half of the pair of side posts; and
   a top having:
      a top panel defining a flat plane; and
      a pair of secondary connectors coupled to the top panel;
   the top being transitional between a first deployed position, and a second deployed position, in the first deployed position, the pair of secondary connectors are coupled to respective ones of the first pair of primary connectors and the flat plane defined by the top panel is horizontally disposed at the upper half of the pair of side posts, and in the second deployed position, the pair of secondary connectors are coupled to respective ones of the second pair of primary connectors and the flat plane defined by the top panel is horizontally disposed at the lower half of the pair of side posts.

10. The truck bed cover of claim 9, wherein the first pair of primary connectors are identical to the second pair of primary connectors.

11. The truck bed cover of claim 9, wherein the first pair of longitudinal extension members extend from respective ones of the pair of side posts adjacent the top ends thereof.

12. The truck bed cover of claim 9, wherein the second pair of primary connectors are adherable to the truck bed.

13. The truck bed cover of claim 9, wherein each of the pair of secondary connectors include a portion pivotable relative to the top panel.

14. The truck bed cover of claim 9, wherein the pair of secondary connectors are selectively engageable with the first pair of primary connectors and the second pair of primary connectors via snap-fit engagement.

15. The truck bed cover of claim 9, wherein a portion of the first set of primary connectors is resilient.

16. A cover for a truck bed comprising a pair of truck bed walls, the cover comprising:
   a pair of support frames engageable with the truck bed in opposed relation to each other, each support frame having an upper longitudinal member and a lower longitudinal member spaced from the upper longitudinal member;

a pair of upper connectors coupled to respective ones of the pair of support frames at the upper longitudinal member thereof and disposed adjacent to an upper half of the pair of side posts;

a pair of lower connectors coupled to respective ones of the pair of support frames at the lower longitudinal member thereof and disposed adjacent to a lower half of the pair of side posts;

a top having defining a flat plane:
   a top panel defining a flat plane; and
   a pair of panel connectors coupled to the top panel;

the top being transitional between a first deployed position, and a second deployed position, in the first deployed position, the pair of panel connectors are coupled to respective ones of the pair of upper connectors and the flat plane defined by the top panel is horizontally disposed at the upper half of the pair of side posts, and in the second deployed position, the pair of panel connectors are coupled to respective ones of the pair of lower connectors and the flat plane defined by the top panel is horizontally disposed at the lower half of the pair of side posts.

17. The cover of claim 16, wherein the pair of upper connectors are identical to the pair of lower connectors.

18. The cover of claim 16, wherein on each support frame, the upper longitudinal member is parallel to the lower longitudinal member.

19. The cover of claim 16, wherein each of the pair of panel connectors include a portion pivotable relative to the top panel.

20. The cover of claim 16, wherein the pair of panel connectors are selectively engageable with the pair of upper connectors and the pair of lower connectors via snap-fit engagement.

* * * * *